US009314849B2

(12) United States Patent
Tracy et al.

(10) Patent No.: US 9,314,849 B2
(45) Date of Patent: Apr. 19, 2016

(54) SYNTHESIS OF NANOSTRUCTURES

(71) Applicant: North Carolina State University, Raleigh, NC (US)

(72) Inventors: Joseph B. Tracy, Cary, NC (US); Krystian A. Kozek, Nashville, TN (US); Klaudia Kozek, Apex, NC (US)

(73) Assignee: North Carolina State University, Raleigh, NC (US)

( * ) Notice: Subject to any disclaimer, the term of this patent is extended or adjusted under 35 U.S.C. 154(b) by 498 days.

(21) Appl. No.: 13/779,003

(22) Filed: Feb. 27, 2013

(65) Prior Publication Data

US 2015/0239049 A1 Aug. 27, 2015

Related U.S. Application Data

(60) Provisional application No. 61/604,467, filed on Feb. 28, 2012.

(51) Int. Cl.
*B22F 9/24* (2006.01)
*C21B 15/00* (2006.01)

(52) U.S. Cl.
CPC . *B22F 9/24* (2013.01); *C21B 15/00* (2013.01); *B22F 2009/245* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 7,588,624 B2 * | 9/2009 | Mirkin et al. | | 75/343 |
| 8,030,242 B2 * | 10/2011 | Uzio et al. | | 502/325 |
| 8,033,715 B2 * | 10/2011 | Perez-Luna et al. | | 374/102 |
| 2009/0297388 A1 * | 12/2009 | Xia et al. | | 420/463 |
| 2010/0046072 A1 * | 2/2010 | Matsunami | | 359/492 |
| 2011/0189483 A1 | 8/2011 | Zubarev | | |

FOREIGN PATENT DOCUMENTS

WO 2008130999 A1 10/2008

OTHER PUBLICATIONS

Erhan I. Altinoglu and James H. Adair Near infrared imaging with nanoparticles, Advanced Review, vol. 2, Sep./Oct. 2010 John Wiley & Sons, Inc. pp. 461-477.
Nikhil R. Jana, Latha Gearheart, and Catherine J. Murphy Seed-Mediated Growth Approach for Shape-Controlled Synthesis of Spheroidal and Rod-like Gold Nanoparticles Using a Surfactant Template Adv. Mater. 2001, 13, No. 18, Sep. 14 Wiley-VCH Verlag GmbH, D-69469 Weinheim, 2001 pp. 1389-1392.
Huaqiang Cao, Yan Xu, Jianming Hong, Huibiao Lui, Gui Yin, Baolong Li, Chenyang Tie, and Zheng Xu Sol-Gel Template Synthesis of an Array of Single Crystal CdS Nanowires on a Porous Alumina Template Adv. Mater. 2001, 13, No. 18, Sep. 14 Wiley-VCH Verlag GmbH, D-69469 Weinheim, 2001 p. 1393.

(Continued)

*Primary Examiner* — George Wyszomierski
(74) *Attorney, Agent, or Firm* — Kilpatrick Townsend & Stockton LLP

(57) ABSTRACT

A method for making a nanostructure is provided. The method includes adding a seed solution to a first aqueous growth solution to produce a nanoparticle solution in a first growth phase and continuously adding a second growth solution to the nanoparticle solution to form a nanostructure in a second growth phase. Related nanostructures are also provided.

19 Claims, 39 Drawing Sheets

(56) References Cited

OTHER PUBLICATIONS

Nikhil R. Jana, Latha Gearheart, and Catherine J. Murphy Wet Chemical Synthesis of High Aspect Ratio Cylindrical Gold Nanorods Department of Chemistry and Biochemistry, University of South Carolina, 631 Sumter Street, Columbia, South Carolina 29208 Received: Mar. 1, 2001; In Final Form: Mar. 30, 2001 J. Phys. Chem. B 2001, 105, pp. 4065-4067.

Babak Nikookbakht and Mostafa A. El-Sayed Preparation and Growth Mechanism of Gold Nanorods (NRs) Using Seed-Mediated Growth Method Laser Dynamics Laboratory, School of Chemistry and Biochemistry, Georgia Institute of Technology, Atlanta, Georgia 30332-0400 Received Jul. 11, 2002. Revised Manuscript Received Oct. 28, 2002 Chem. Mater. 2003, 15, pp. 1957-1962.

Catherine J. Murphy, Tapan K. Sau, Anand M. Gole, Christopher J. Orendorff, Jinxin Gao, Linfeng Gou, Simona E. Hunyadi, and Tan Li Anisotropic Metal Nanoparticles: Synthesis, Assembly, and Optical Applications Department of Chemistry and Biochemistry, University of South Carolina, 631 Sumter Street, Columbia, South Carolina 29208 Received: Apr. 2, 2005; In Final Form: May 6, 2005.

Catherine J. Murphy, Lucas B. Thompson, Davin J. Chernak, Jie An Yang, Sean T. Sivapalan, Stefano P. Boulos, Jingya Huang, Alaaldin M. Alkilany, Patrick N. Sisco Gold nanorod crystal growth: From seed-mediated synthesis to nanoscale sculpting Available online Jan. 12, 2011 Current Opinion in Colloid & Interface Science 16 (2011) p. 128-134.

Xingchen Ye, Linghua Jin, Humeyra Caglayan, Jun Chen, Guozhong Xing, Chen Zheng, Vicky Doan-Nguyen, Yijin Kang, Nader Engheta, Cherie R. Kaan, and Christopher B. Murray Improved Size-Tunable Synthesis of Monodisperse Gold Nanorods through the Use of Aromatic Additives Published online Feb. 29, 2012 vol. 6 No. 3 pp. 2804-2817 2012.

Michelle L. Personick, Mark R. Langille, Jian Zhang, and Chad A. Mirkin Shape Control of Gold Nanoparticles by Silver Underpotential Deposition Published: Jul. 1, 2011 Nano Lett. 2011, 11, pp. 3394-3398.

M.A. Garcia, V. Bouzas, N. Carmona Influence of stirring in the synthesis of gold nanorods Materials Chemistry and Physics 127 (2011) pp. 466-450.

Maria Tornblom and Ulf Henriksson Effect of Solubilization of Aliphatic Hydrocarbons on Size and Shape of Rodlike C16TABr Micelles Studied by 2H NMR Relaxation J. Phys. Chem. B 1997, 101, pp. 6028-6035 Received: Mar. 11, 1997; In Final Form: May 30, 1997.

T.K. Sau & C.J. Murphy, Role of ions in the colloidal synthesis of gold nanowires, Philosophical Magazine, 87:14-15, pp. 2143-2158.

Niti Garg, Clark, Scholl, Ashok Mohanty, and Rongchao Jin, The Role of Bromide Ions in Seeding Growth of Au Nanorods, Langmuir 2010, 26(12), pp. 10271-10276, Published on Web Apr. 15, 2010.

Satyabrata Si, Cecile Leduc, Marie-Helene Delville, and Brahim Lounis, Short Gold Nanorod Growth Revisited: The Critical Role of the Bromide Counterion, ChemPhysChem 2012, 13, p. 193-202 2012 Wiley-VCH Verlag GmbH& Co. KGaA, Weinheim.

Christopher J. Orendorff and Catherine J. Murphy, Quantitation of Metal Content in the Silver-Assisted Growth of Gold Nanorods, J. Phys. Chem. B 2006, 110, pp. 3990-3994, Published on Web Feb. 3, 2006.

Linfeng Gou and Catherine J. Murphy, Fine-Tuning the Shape of Gold Nanorods, Chem. Mater. 2005, 17, pp. 3668-3672, Published on Web Jun. 9, 2005.

Heidrun A. Keul, Martin Moller, and Michael R. Bockstaller, Structural Evolution of Gold Nanorods during Controlled Secondary Growth, Langmuir 2007, 23, pp. 10307-10315, Published on Web Aug. 22, 2007.

Andy Wijaya, Stefan B. Schaffer, Ivan G. Pallares, and Kimberly Hamad-Schifferli, Selective Release of Multiple DNA Oligonucleotides from Gold Nanorods, Published online Dec. 16, 2008, vol. 3 No. 1 Wijaya et al. www.acsnano.org, pp. 80-86.

Fulvio Ratto, Paolo Matteini, Francesca Rossi, and Roberto Pini, Size and shape control in the overgrowth of gold nanorods, J Nanopart Res (2010) 12: pp. 2029-2036, Published online: Jul. 24, 2009, Springer Science+Business Media B.V. 2009.

Prashant K. Jain, Kyeong Seok Lee, Ivan H. El-Sayed, and Mostafa A. El-Sayed, Calculated Absorption and Scattering Properties of Gold Nanoparticles of Different Size, Shape, and Composition: Applications in Biological Imaging and Biomedicine, J. Phys. Chem. B 2006, 110, pp. 7238-7248, 2006 American Chemical Society Published on Web Mar. 18, 2006.

Jae Hee Song, Franklin Kim, Daniel Kim, and Peidong Yang, Crystal Overgrowth on Gold Nanorods: Tuning the Shape, Facet, Aspect Ratio, and Composition of the Nanorods, 2005 Wiley-VCH Verlag GmbH&Co. 910 KGaA, Weinheim, Chem. Eur. J. 2005, 11, pp. 910-916.

F. Hubert, F. Testard, A. Thill, Q. Kong, O. Tache, O. Spalla, Growth and Overgrowth of Concentrated Gold Nanorods: Time Resolved SAXS and XANES, pubs.acs.org/crystal, 2012 American Chemical Society, Cryst. Growth Des. 2012, 12, pp. 1548-1555.

Yeong-Joon Kim and Jae Hee Song, Tailored Secondary Growth on Au Nanorods through Regioselective Adsorption, Japanese Journal of Applied Physics 49 (2010) 05EA13-05EA13-3, published online May 20, 2010.

Danielle K. Smith, Nathan R. Miller, Brian K. Korgel, Iodide in CTAB Prevents Gold Nanorod Formation, DOI: 10.1021/la900757s, Published on Web May 4, 2009, Langmuir 2009, 25(16), pp. 9518-9524.

Danielle K. Smith, and Brian K. Korgel, The Importance of the CTAB Surfactant on the Colloidal Seed-Mediated Synthesis of Gold Nanorods, 2008 American Chemical Society Published on Web Jan. 10, 2008, Langmuir 2008, 24, pp. 644-649.

Raja Gopal Rayavarapu, Constantin Ungureanu, Petra Krystek, Ton. G. Van Leeuwen, and Srirang Manohar, Iodide Impurities in Hexadecyltrimethylammonium Bromide (CTAB) Products: Lot-Lot Variations and Influence on Gold Nanorod Synthesis, DOI: 10.1021/la100166f, Published on Web Mar. 5, 2010 Langmuir 2010, 26(7), pp. 5050-5055.

Xiaohua Huang, Svetlana Neretina, and Mostafa A. El-Sayed, Gold Nanorods: From Synthesis and Properties to Biological and Biomedical Applications, 2009 Wiley-VCH Verlag GmbH & Co. KGaA, Weinheim Adv. Mater. 2009, 21, pp. 4880-4910.

* cited by examiner

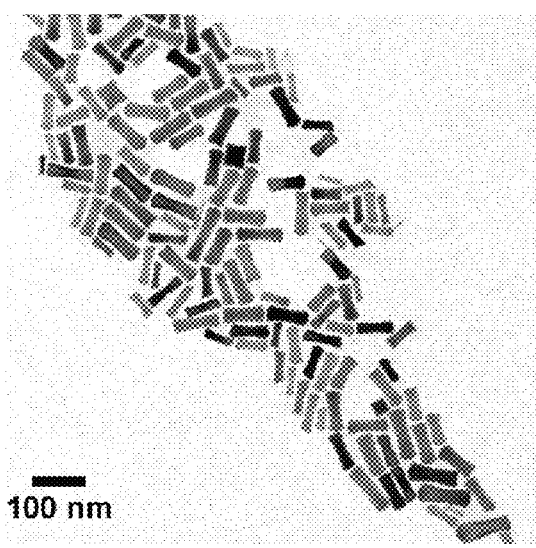
Figure 27A
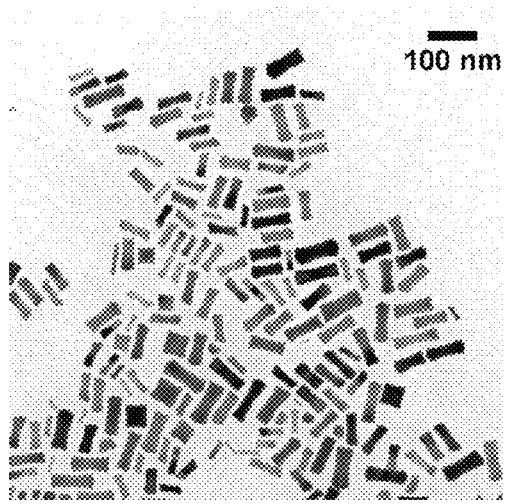 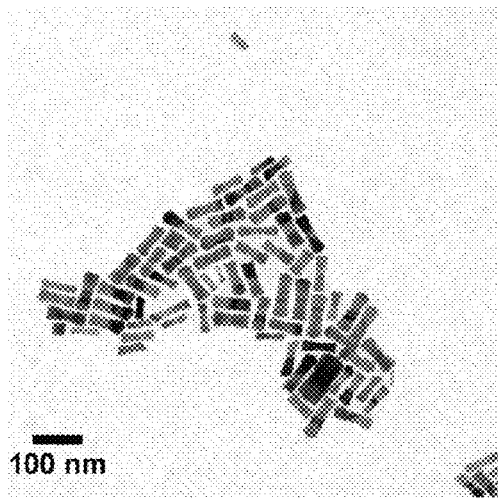
Figure 27B     Figure 27C

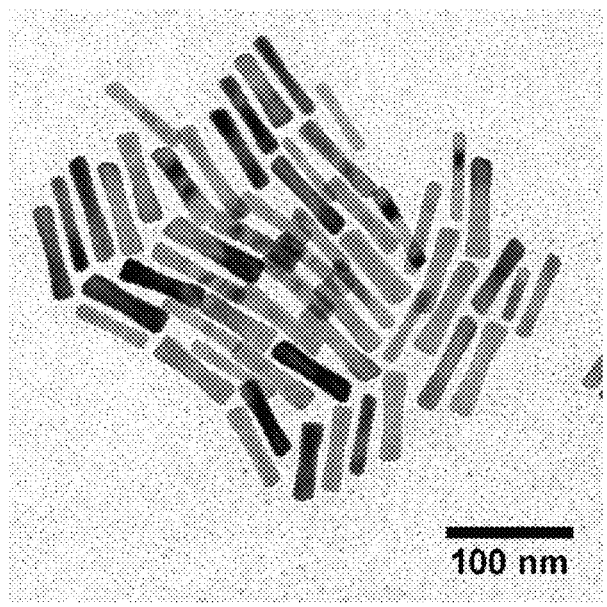
Figure 30A
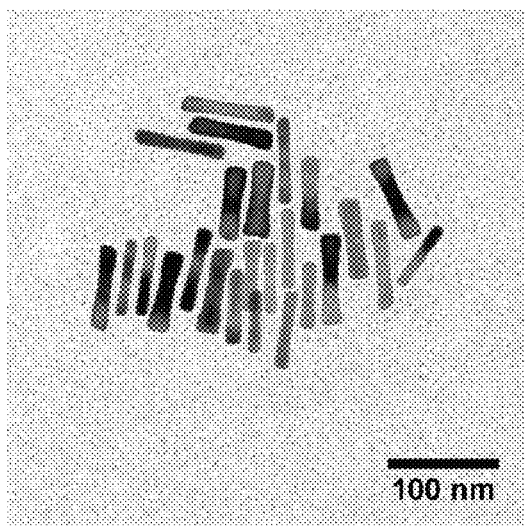 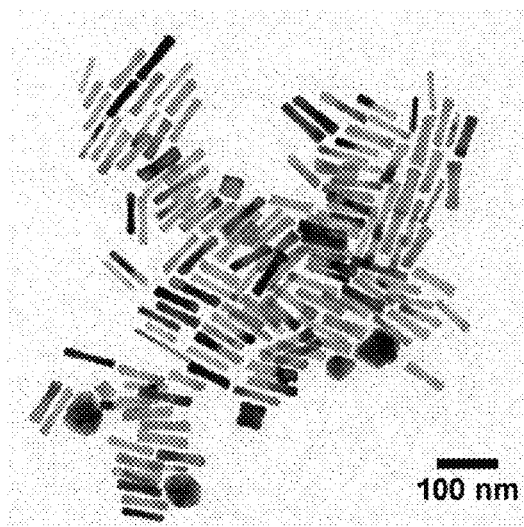
Figure 30B  Figure 30C

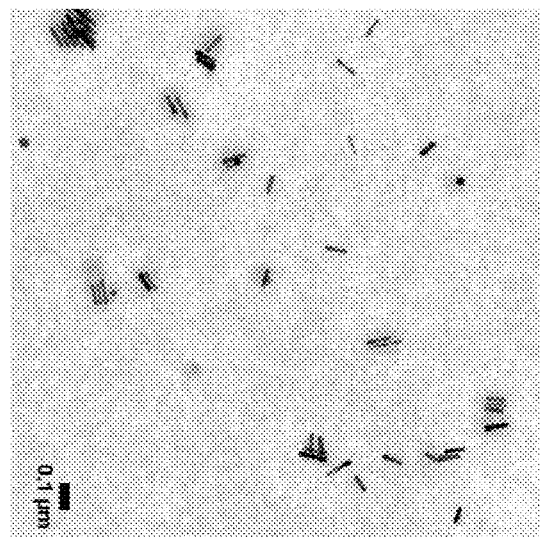
Figure 34A
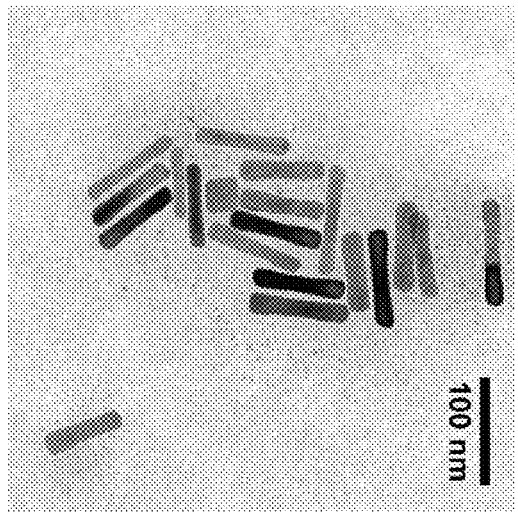 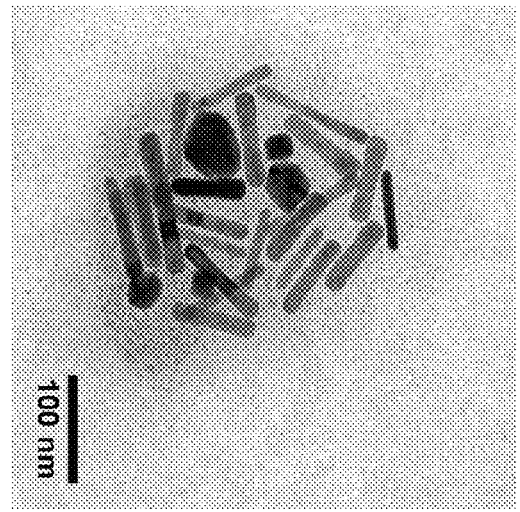
Figure 34B　　　Figure 34C

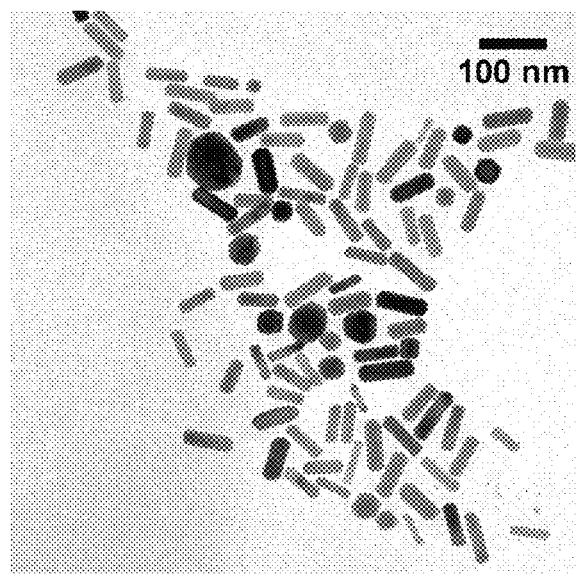
Figure 35A
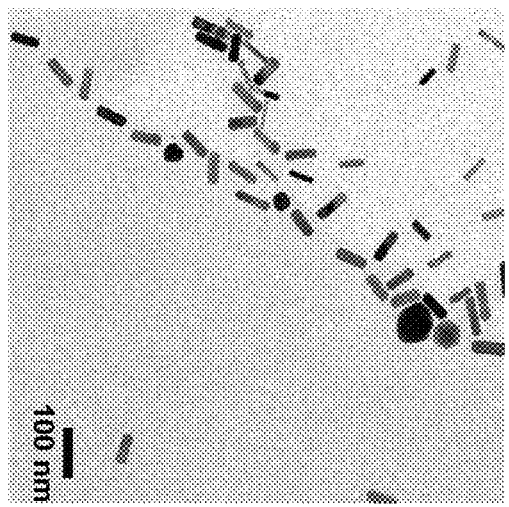      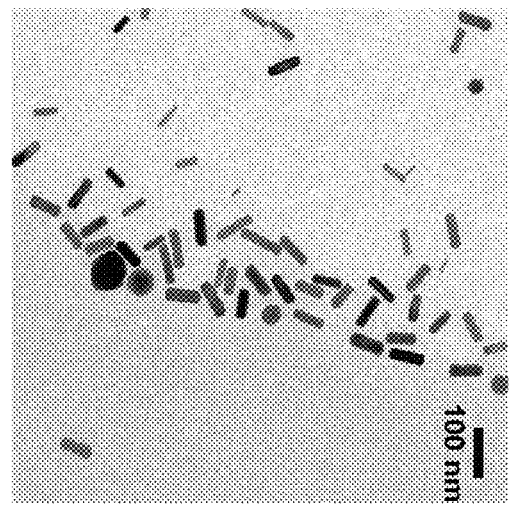
Figure 35B          Figure 35C

SYNTHESIS OF NANOSTRUCTURES

CROSS-REFERENCE TO RELATED APPLICATIONS

This application claims priority to U.S. Provisional Patent Application No. 61/604,467, filed on Feb. 28, 2012, the entire contents of which are hereby incorporated by reference.

FEDERALLY SPONSORED RESEARCH OR DEVELOPMENT

The technology disclosed herein was made with government support under award number 1056653 awarded by the Solid State and Materials Chemistry Program of the National Science Foundation. The United States government may have certain rights in the technology.

TECHNICAL FIELD

This disclosure is related to a nanostructure, and more particularly towards a method for forming a nanostructure having improved optical absorption and scattering characteristics and ease of manufacturing and production.

BACKGROUND

Nanostructures may have applications in many fields, including industrial, medical, imaging, electronics, and magnetics. Nanostructures may take on any variety of shapes and sizes and may be formed from one or more materials.

One such nanostructure is a gold nanorod (GNR). GNRs demonstrate potential in a broad range of applications ranging from medicine and pharmacology to renewable energy and catalysis, often in composite materials or as parts of more complex molecular systems. Current efforts in research and development of GNRs are limited, however, by inefficient and laborious synthetic procedures. Current methods employed produce GNR solutions in small, polydisperse volumes and require a considerable amount of time to produce a suitable amount for production. Commonly used methods for producing GNRs also have an unacceptably low yield by mass, utilizing only approximately 29% of the gold precursor. These limitations have caused production of GNRs to be cost and time prohibitive.

Accordingly, a need exists for a method of making GNRs that addresses the cost and time prohibitive characteristics of conventional methods.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Disclosed herein is a method for making a nanostructure. The method includes adding a seed solution to a first aqueous growth solution to form a nanoparticle solution in a first growth phase and continuously adding a second growth solution to the nanoparticle solution to form a nanostructure in a second growth phase.

According to one or more embodiments, the seed solution includes metal nano structures.

According to one or more embodiments, the metal nanostructures are gold nano structures.

According to one or more embodiments, the seed solution includes a borohydride.

According to one or more embodiments, the borohydride is sodium borohydride ($NaBH_4$).

According to one or more embodiments, the method includes adding a bromide salt to the seed solution.

According to one or more embodiments, the bromide salt includes potassium bromide.

According to one or more embodiments, the method includes adding surfactants to the first growth solution.

According to one or more embodiments, the surfactants are one of cetyltrimethylammonium bromide (CTAB), cetyltrimethylammonium chloride (CTAC), benzyldimethylhexadecylammonium chloride (BDAC), and benzyldimethylhexadecylammonium bromide (BDAB), or mixtures thereof.

According to one or more embodiments, the method includes adding metal ions to the first growth solution.

According to one or more embodiments, the metal ions are Gold.

According to one or more embodiments, the metal ions are Silver.

According to one or more embodiments, the metal ions are Iron.

According to one or more embodiments, the method includes adding a reducing agent to the first growth solution.

According to one or more embodiments, the reducing agent is ascorbic acid.

According to one or more embodiments, the method includes adding bromide salts to the first growth solution.

According to one or more embodiments, the bromide salt includes potassium bromide.

According to one or more embodiments, the method includes adding a base into the first growth solution.

According to one or more embodiments, the base is sodium hydroxide.

According to one or more embodiments, the second growth solution includes a reducing agent.

According to one or more embodiments, the reducing agent includes ascorbic acid.

According to one or more embodiments, the second growth solution includes a metal hydroxide.

According to one or more embodiments, the metal hydroxide is sodium hydroxide.

According to one or more embodiments, the second growth solution includes a metal ion.

According to one or more embodiments, the metal ions are Gold.

According to one or more embodiments, the metal ions are Silver.

According to one or more embodiments, continuously adding a second growth solution includes injecting the second growth solution at a constant rate.

According to one or more embodiments, the injection is automated.

According to one or more embodiments, multiple points of injection are used.

According to one or more embodiments, the injection occurs at a rate that is varied.

According to one or more embodiments, continuously adding a second growth solution includes injecting the second growth solution at a variable rate.

According to one or more embodiments, the second growth phase occurs between one second and one month.

According to one or more embodiments, the second growth phase occurs between about two and one half hours and about 28 hours.

According to one or more embodiments, the method includes agitation during the second growth phase.

According to one or more embodiments, agitation is continuous.

According to one or more embodiments, agitation is automated.

According to one or more embodiments, agitation includes stirring.

According to one or more embodiments, agitation includes sonication.

According to one or more embodiments, agitation includes vibration.

According to one or more embodiments, agitation includes shaking.

According to one or more embodiments, more than one second growth solutions are added in parallel.

According to one or more embodiments, a solution of a reducing agent and a solution of a base are added in parallel.

According to one or more embodiments, the reducing agent includes ascorbic acid and the base includes sodium hydroxide.

According to one or more embodiments, a solution including a reducing agent and a solution including a metal ion are added in parallel.

According to one or more embodiments, the reducing agent includes ascorbic acid and the metal ions include Gold.

According to one or more embodiments, a solution of a base and a solution of a metal ion are added in parallel.

According to one or more embodiments, the base includes sodium hydroxide and the metal ion includes Gold.

According to one or more embodiments, a solution of a metal salt is added in parallel with at least one of an additional metal salt solution, a reducing agent solution, or a basic solution.

According to one or more embodiments, the first metal salt solution includes iron ions, the reducing agent includes ascorbic acid, and the additional solutions include gold ions, silver ions, ascorbic acid, sodium hydroxide, and combinations thereof.

According to one or more embodiments, the second growth solution includes a basic solution. Adding the second growth solution is provided for altering the pH of the nanoparticle solution.

According to one or more embodiments, the base includes sodium hydroxide.

According to one or more embodiments, the method includes adding one or more additional, intermediate growth solutions before the addition of the second growth solution.

According to one or more embodiments, the mechanism of addition of the intermediate growth solution and the second growth solution each include use of a variable or constant addition rate, single or multiple injection sites, and automated addition of solution via a syringe pump into a solution.

According to one or more embodiments, the intermediate growth solution is injected quickly.

According to one or more embodiments, addition of the intermediate growth solution may run parallel with the first growth phase and occurs between one second after the beginning of the first growth phase and one second before the beginning of the second growth phase.

According to one or more embodiments, the additional intermediate growth solution includes a metal salt solution.

According to one or more embodiments, the metal ions in the metal salt solution are Iron.

According to one or more embodiments, the method includes adding an additional second growth solution to the nanoparticle solution.

According to one or more embodiments, adding additional second growth solution includes adding a growth solution of Gold and a growth solution of ascorbic acid followed by further adding an additional second growth solution of ascorbic acid.

According to one or more embodiments, the step of adding additional second growth solution including one of metal ions and one of a reducing agent is repeated.

According to one or more embodiments, the metal ions are Gold and the reducing agent is ascorbic acid.

According to one or more embodiments, before the second growth phase is complete, adding additional second growth solution instantaneously in order to reduce the remaining metal ions in the solution, thereby forming dumbbell endings on the nanostructures.

According to one or more embodiments, the second growth solution includes ascorbic acid.

According to one or more embodiments, the second growth solution includes sodium hydroxide.

According to one or more embodiments, the nanostructures formed are nanodumbells.

According to one or more embodiments, the nanostructures formed are nanojacks.

According to one or more embodiments, the method includes adding one or more surfactant to the nanoparticle solution after initiation of the first growth phase.

According to one or more embodiments, the surfactant includes BDAC.

According to one or more embodiments, the surfactants include CTAC and BDAC.

According to one or more embodiments, the solution further includes potassium bromide (KBr).

According to one or more embodiments, the solutions are heated.

According to one or more embodiments, the solutions are heated between about 25 degrees Celsius and about 100 degrees Celsius.

According to one or more embodiments, all solutions are heated to about 30 degrees Celsius.

According to one or more embodiments, adding a seed solution includes adding varying amounts of the seed solution.

According to one or more embodiments, reducing the amount of seed solution added to the first growth solution includes reducing the amount of ascorbic acid added to the first growth solution and adding additional ascorbic acid during the second growth phase.

According to one or more embodiments, increasing the amount of seed solution added to the first growth solution includes increasing the amount of ascorbic acid added to the first growth solution and reducing the amount of ascorbic acid during the second growth phase.

According to one or more embodiments, during either the first or second growth phase, either or both growth phases can be interrupted to remove excess seed and growth solution.

According to one or more embodiments, a nanostructure made according to any method disclosed herein is provided.

According to one or more embodiments, the nanostructure is a nanosphere, nanocube, nanorod, nanodumbbell, nanostar, or nanojack.

According to one or more embodiments, a method for making nanorods is provided. The method includes adding a seed solution of nanostructures to an aqueous growth solution to form a nanorod solution and continuously adding an ascorbic acid solution to the nanorod solution to form a nanorod.

According to one or more embodiments, a method for making nanodumbbells is provided. The method includes adding a seed solution of nanostructures to an aqueous growth solution to form a nanorod solution and continuously adding an ascorbic acid solution to the nanorod solution to form a nanodumbbell.

According to one or more embodiments, a method for making nanodumbbells is provided. The method includes adding a seed solution of nanostructures to an aqueous growth solution to form a nanorod solution and continuously adding a sodium hydroxide solution to the nanorod solution to form a nanodumbbell.

According to one or more embodiments, a method for making gold nanostars is provided. The method includes adding a seed solution of sodium hydroxide to an aqueous growth solution to form a nanosphere solution and continuously adding an ascorbic acid solution to the nanosphere solution to form a nanostar.

According to one or more embodiments, a method for making gold nanostars is provided. The method includes adding a seed solution to an aqueous growth solution to form a nanostar seed solution and continuously adding an ascorbic acid solution to the nanostar seed solution to form a nanostar.

According to one or more embodiments, the seed solution includes nanostructures.

According to one or more embodiments, a method for making gold nanostars is provided. The method includes adding a seed solution of sodium hydroxide to an aqueous growth solution to form a nanosphere solution and continuously adding an ascorbic acid solution to the nanosphere solution to form a nanostar.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings:

FIGS. 27A, 27B, and 27C illustrate TEM images according to one or more experiments disclosed herein;

FIGS. 30A, 30B, and 30C illustrate TEM images according to one or more experiments disclosed herein;

FIGS. 34A, 34B, and 34C illustrate TEM images according to one or more experiments disclosed herein;

FIGS. 35A, 35B, and 35C illustrate TEM images according to one or more experiments disclosed herein;

All TEM images were acquired of GNRs that were sedimented using high-speed centrifugation to remove CTAB. The sedimentation process was performed in a non-selective manner. Therefore, the TEM images are representative of the NPs in the solution and no efforts were made to remove NPs having undesired shapes.

DETAILED DESCRIPTION

The presently disclosed invention is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies.

Figure 1:
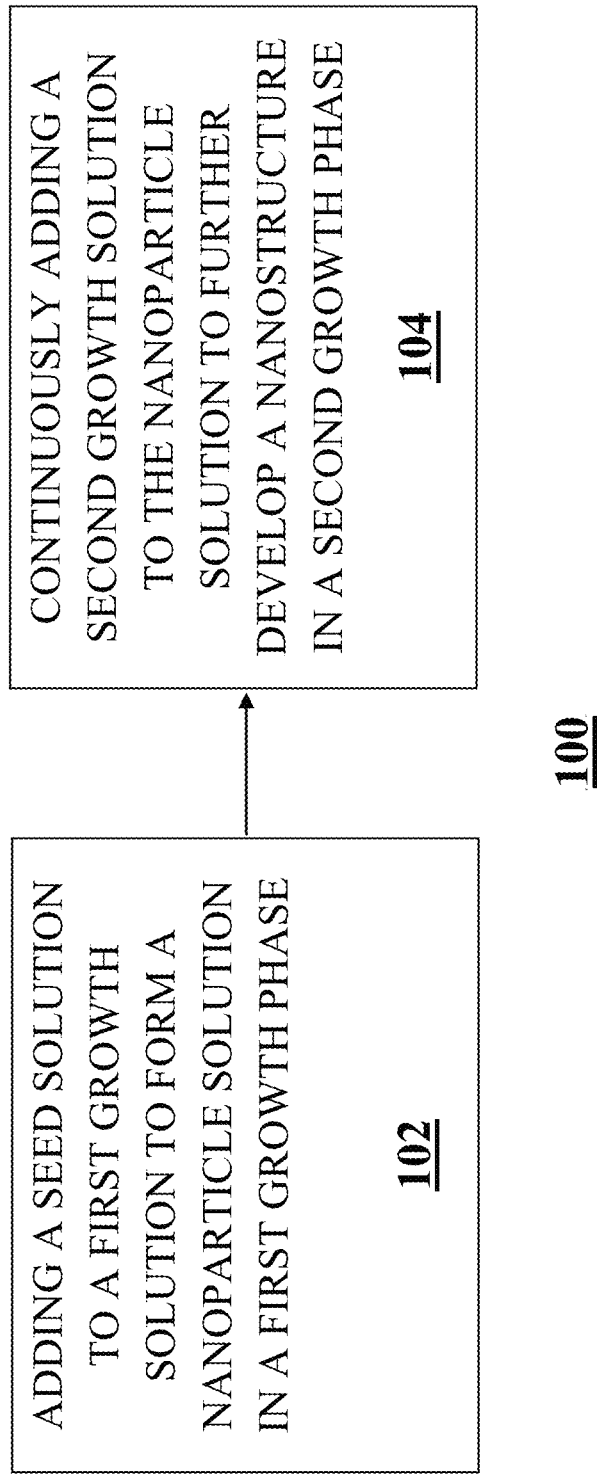
FIG. 1 illustrates a flow chart of one or more methods disclosed herein.

FIG. 1 illustrates one or more methods for making one or more nanostructures. The one or more methods are depicted as 100. The one or more methods 100 may include adding a seed solution to a first aqueous growth solution to form a nanoparticle solution 102 in a first growth phase ("GP1"). The one or more methods 100 may include continuously adding a second growth solution to the nanoparticle solution to form a nanostructure 104 in a second growth phase ("GP2").

Each of the acts 102 and 104 will be further described with reference to the Experimental Results provided herein.

EXPERIMENTAL RESULTS

In one or more experiments, GNRs were synthesized using the one or more steps disclosed herein.

The following abbreviations may be used herein:
NP: nanoparticle;
GNR: gold nanorod;
GNRD: gold nanorod dumbbell;
GNS: gold nanostar;
SS: seed solution;
GS1: growth solution one;
NPS1: nanoparticle solution one;
NRS1: nanorod solution one (equivalent to NPS1, but where the NPs are GNRs);
GS2: growth solution two;
GP1: growth phase one;
GP2: growth phase two;
AA: ascorbic acid;
CTAB: cetyltrimethylammonium bromide;
CTAC: cetyltrimethylammonium chloride;
BDAB: benzyldimethylhexadecylammonium bromide;
BDAC: benzyldimethylhexadecylammonium chloride;
NaOH: sodium hydroxide;
KBr: potassium bromide;
Au: gold;
Ag: silver;
Fe: iron
NIR: near infrared;
FWHM: full width at half the maximum measurement; and
TEM: transmission electron microscopy.

In one or more experiments disclosed herein, the following concentrations and volumes may be utilized as a non-limiting example thereof:

In a first experiment, a first growth solution ("GS1") has a total volume of 200 mL or 1000 mL comprised of 0.094413 M CTAB, 0.018823 M KBr (referred to as 0.2×KBr for GS1), 0.001054 M AA, 0.000192 M AgNO$_3$, and 0.000962 M HAuCl$_4$.xH$_2$O, where x was estimated as three for weighing the mass of HAuCl$_4$.xH$_2$O. Adjustment of the pH at 1×NaOH was accomplished by adding 0.001054 moles of NaOH per 1000 mL of GS1. A seed solution ("SS") has a total volume of 10 mL and includes 0.099877 M CTAB, 0.009991 M KBr (referred to as 0.1×KBr for SS), and 0.000254 M HAuCl$_4$.xH$_2$O. To initiate growth of seeds in the SS, 0.6 mL of an ice-cold, 0.009992 M NaBH$_4$ solution is added. After adding NaBH$_4$, 2.715 mL of the SS (referred to as 1×SS) is added to GS1 to initiate growth of GNRs or related nanostructures. When a second growth solution ("GS2") is provided and includes ascorbic acid ("AA")—the volume of GS2 was chosen to be 12 mL for a 200 mL solution or 60 mL for a 1000 mL solution—such that the volume of GS2 would be 6.00% of the volume of GS1, and the concentration was 0.00788 M AA, which is referred to as 0.1×AA. When GS2 was NaOH, the volume of GS2 was chosen to be 10 mL or 50 mL, such that the volume of GS2 would be 5.00% of the volume of GS1, and the concentration was 0.210765 M (referred to as 10×NaOH). When benzyldimethylhexadecylammonium chloride ("BDAC") was added to a first nanorod solution ("NRS1"), the concentration was 0.09497 M, which is referred to as 1×BDAC. When cetyltrimethylammonium chloride ("CTAC") was added to NRS1, the concentration was 0.018828 M, which is referred to as 0.2×CTAC. For adjusting the SS from 1×SS to other values, the volume of the SS added to GS2 was scaled proportionally. When adjusting the concentrations from 0.1×AA, 10×NaOH, 1×BDAC, or 0.2×CTAC to other values, the concentrations were scaled proportionally. In addition to the volume of GS2 changing proportionally with a change in the NRS1 volume, the volume can be adjusted as seen necessary for total volume control, as long as the moles of AA added per minute remains the same. For example, at 1 L, the GS2 volume can be 30 mL instead of 50 mL if the AA moles are not reduced but the injection rate (volume/time) is decreased to ⅗ of the rate for 50 mL.

An aliquot of a SS is added to GS1 in GP1 to generate the NRS1. In the first experiment disclosed herein, the SS may be a solution containing gold nanostructures and NaBH$_4$. GS2 was then added to NRS1 in GP2 to create a final solution of GNRs.

Preparation of GS1 may be advantageously completed in less than two hours and can be done in parallel with the SS. One or more solutions, and, in one or more experiments, five separate solutions were prepared and combined in sequential order to create GS1. In one or more embodiments, cetyltrimethylammonium bromide (CTAB) was dissolved in deionized water with gentle heating (solution 1). In one or more embodiments, potassium bromide was dissolved in deionized water (solution 2). In one or more embodiments, AgNO$_3$ was dissolved in deionized water (solution 3). In one or more embodiments, HAuCl$_4$.xH$_2$O was dissolved in deionized water (solution 4). In one or more embodiments, ascorbic acid was dissolved in deionized water (solution 5). Immediately after preparation, solution 1 was placed into a temperature-controlled water bath preheated to between about 27° C. and about 30° C. to avoid solidification of the CTAB while continuously stirring with a magnetic stirbar as each precursor was added. Solutions 2, 3, 4, and 5 were sequentially added to solution 1. Between each addition, the combined solution was stirred to ensure a thoroughly mixed GS1.

Caution was exercised to avoid foaming. GS1 was left in the water bath at 30° C. while the SS was prepared. In one or more experiments, preparation of the SS may take up to one hour to complete. In one or more experiments, SS was prepared by combination of the solutions in which CTAB was dissolved in deionized water with gentle heating (solution 6), potassium bromide was dissolved in deionized water (solution 7), HAuCl$_4$.xH$_2$O was dissolved in deionized water (solution 8), NaBH$_4$ was dissolved in ice-cold water immediately after preparation (solution 9), solution 6 was placed into a preheated, temperature-controlled water bath of 30° C. to avoid solidification of the CTAB. Solution 6 was continuously stirred with a magnetic stirbar and stirplate to ensure complete mixing when solution 7 and then 8 was added. While still in the water bath and stirring vigorously, an aliquot of solution 9 was then added the SS. After two minutes of vigorous stirring, followed by a three minute period of seed growth without stirring, the solution was ready for use. The composition of SS evolved over the entire 5 minute process, and continued to evolve for over 2 days. In order to account for the evolution of composition, once solution 9 has been added, the SS may be used promptly. GP1 may be initiated by thoroughly mixing an aliquot of SS into solution GS1 and leaving the combined solution, identified as solution NRS1, to grow without stirring for about one hour.

The most commonly employed methods for synthesizing GNRs use solution NRS1 for their studies. Analysis of the products has shown, however, that only about 29% of the Au precursor reacted to form GNRs in solution NRS1. In one or more experiments, GP2 completed the reaction and increased the GNR yield to nearly 100%. GS2 consisted of L-ascorbic acid dissolved in deionized water and can be prepared in under 5 min, while GP1 took place. GS2 was loaded into a syringe and slowly added into NRS1 by syringe pump. This solution was added continuously over a period of about three hours, although this time can vary, under continuous stirring in a temperature-controlled water bath preheated to 30° C. GP2 ensured that the remaining Au precursor reacted and grew onto the NRS1, thereby increasing the GNR size, which makes the surface plasmon resonance more intense. Another advantage of this method is good GNR size and aspect ratio monodispersity.

Use of the syringe pump may allow for improved reproducibility of GP2, vastly decreases the amount of labor to about 5 minutes, and decreases the reaction time from four days to less than a day, as compared with conventional methods and processes. The use of stirring in one or more methods allows for a more accurate prediction of the final GNR optical properties and shape, as a very consistent and tunable peak shift after GP2 can be observed.

The following reactions took place in one or more experiments disclosed herein:

GP1: SS+GS1=>NPS1 time to complete: about 40 minutes without KBr, or about 60 minutes with KBr; and GP2: NPS1+GS2=>GNRs time to complete: about 2 hours and 50 minutes or longer using AA to make GNRs, and less than about 9 hours to make GNRs or GNRDs with NaOH.

All solutions with quantitative absorbance values were diluted by a factor of 1 part GNR solution to 5 parts CTAB solution (including a solution containing a CTAB concentration equimolar to that used to create GS1).

In one or more embodiments, the one or more methods disclosed herein may be utilized to make one or more shapes of gold nanoparticles. In one or more methods, these additional shapes and sizes of gold nanoparticles may be formed by adjusting certain parameters. The additional shapes may have similar optical properties to each other, or may have different optical properties. For example, by varying the initial seed shape, size, metal composition, and impurity concentration present in the SS, a gold nanoparticle of a desired shape and size could be formed.

In one or more embodiments, one or more methods may include adjusting the parameters of GP2 in order to tune the longitudinal surface plasmon over a range of wavelengths. One or more methods may also include varying multiple aspects of the synthesis to further tune the absorbance wavelength and improve the overall sample quality, thereby reducing the proportion of undesired shapes.

One or more methods disclosed herein may produce GNRs whose longitudinal surface plasmon resonance can be tuned from about 530 nm to over about 1000 nm. In one or more embodiments, longitudinal surface plasmon resonance may exceed 1000 nm. The one or more methods may be used to perform large-scale production of monodisperse GNRs at 800 nm, which may be desirable for biomedical applications.

In one or more methods, agitation of the CTAB layer that coats the GNRs may be performed. Previously, it may have been believed that GNR growth occurred best without stirring. In the one or more methods, stirring during GP2 and controlled, continuous addition of one or more reactants may provide for GNR growth while stirring. In one or more experiments, it was shown that dog-bone and peanut-shaped GNRDs can be obtained if one or more of the reactants were added more quickly.

In one or more methods, during GP2, stirring may be utilized to perturb the bilayer of CTAB surrounding the GNRs. In one or more methods, other manners of perturbing the bilayer, such as sonication, shaking, boiling, and combinations thereof, may enable similar growth.

In one or more methods, Au seeds with borohydride may be used as the SS. In one or more embodiments, any appropriately characterized metal synthesized in any manner may be employed to produce any shape. The shape may then be grown larger through GP2 using GS2. In one or more embodiments, a solution of NaOH could be used to seed NPs to make gold nanostars. In one or more embodiments, silver seeds could be used to create gold nanostars. Furthermore, depending on which reactant is used in GS2, either AA or NaOH, variably shaped NPs could be grown from these already different shapes, such as, for example, gold nanostars could be grown from silver seeds to produce larger gold nanostars if grown with AA, or they could be used to grow gold nanojacks using NaOH. The nanojacks would be similar to nanostars with peanut-shaped endings of the GNRDs.

The GP2 process can be used to grow different shapes from NPs present in the NPS1 solution, whereas the GP1 process can be used to grow different shapes in the NPS1 solution. GP1 may depend on two factors: the SS and the components in GS1. As discussed, adjusting the SS can achieve desired results. In one or more embodiments, the shape of the NPs in NPS1 may be altered by changing the Ag/Au ratio in GS1, by changing the CTAB concentration, or by adding different surfactants, such as CTAC, BDAC, BDAB, and the like.

In one or more embodiments, the concentration of AA may be varied. However, in one or more experiments, it was determined that there is a predetermined amount of AA that needs to be added for reaction of the excess Au in solution. For example, in the one or more experiments, 12 mL of GS2 per 200 mL of NRS1 was used. In the one or more experiments discussed herein, the concentration of AA added is proportional to the concentration of the AA solution diluted into GS1. For example, the representation 0.1×AA would indicate a concentration of AA in the GS2 added that is a tenth of that prepared for addition into GS1. In the one or more experiments in which a predetermined concentration of AA is used, the injection rate of solution is varied to produce GNRs with different surface plasmon resonance wavelengths over the visible-NIR spectrum. In the one or more experiments, the injection rate for GS2 was 35 microliters/minute for a 1 L solution. Many of the one or more experiments were run on 200 mL solutions, for which the results generally correlate well with reactions performed on the 1-L scale. Accordingly, the nomenclature will scale appropriately based on solution's size, such as that which is reproduced in TABLE I.

TABLE I

| Representation | Rate of Addition | Rate of Addition |
|---|---|---|
| 1× IN | 35 microliters/min @ 1 L | 7 microliters/min @ 200 mL |
| 5× IN | 175 microliters/min @ 1 L | 35 microliters/min @ 200 mL |
| 10× IN | 350 microliters/min @ 1 L | 70 microliters/min @ 200 mL |

If more concentrated solutions were used, the rate of solution addition would have to be slowed down to ensure that the mass of AA added over a given amount of time would be the same.

In one or more embodiments, the longitudinal absorption peak of the GNRs may be altered from about 820 nm to about 530 nm by varying the addition rate of 12 mL of 0.1×AA GS2 to 200 mL of NPS1. In one or more experiments, it was shown that the slower the addition rate, the greater the shift towards 530 nm. Table II reproduced below shows experimental results based on solution, growth time, and approximate absorbance when starting from a NPS1 solution at about 825 nm.

TABLE II

| Solution | Growth Time | Approximate Absorbance |
|---|---|---|
| 10× IN | 2 hours and 50 minutes | 795 nm |
| 5× IN | 5 hours and 40 minutes | 767 nm |
| 1× IN | 28 hours and 20 minutes | 660 nm |

Figure 2:
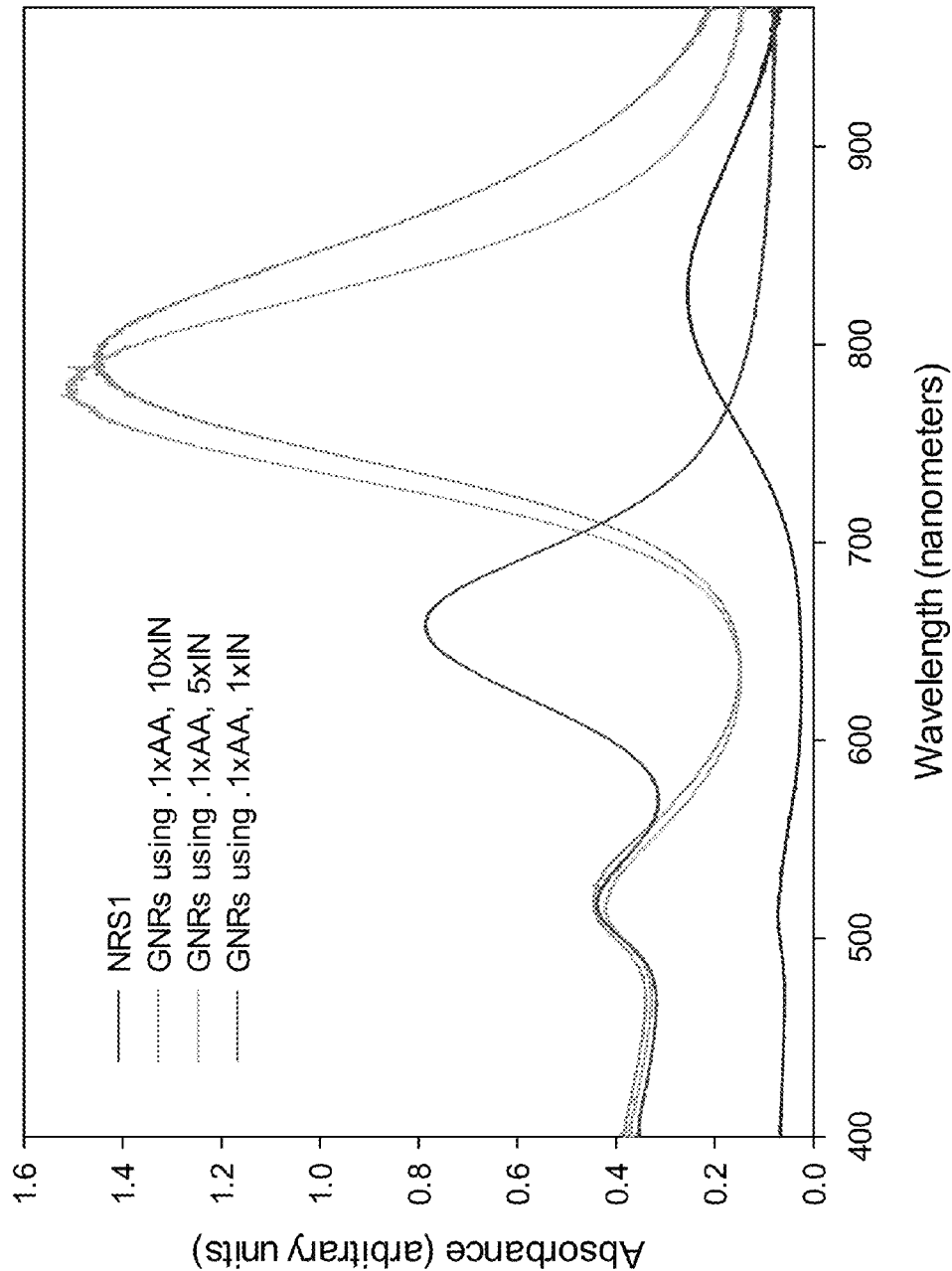
FIG. 2 illustrates experimental results according to one or more experiments disclosed herein.

The growth times in TABLE II may be lengthier than necessary; however, these times were selected to ensure that the reaction is complete, meaning all of the gold precursor is consumed and converted into GNRs. The results of these additions can be seen in FIG. 2, and these results show that by adjusting the AA addition rate, while keeping the AA solution concentration constant, the GNRs may be altered to a desired absorbance over a wide range of the visible spectrum. TEM images of the sample grown at 10×IN are shown in FIGS. 26A, 26B, 26C, and 26D.

Figure 3:
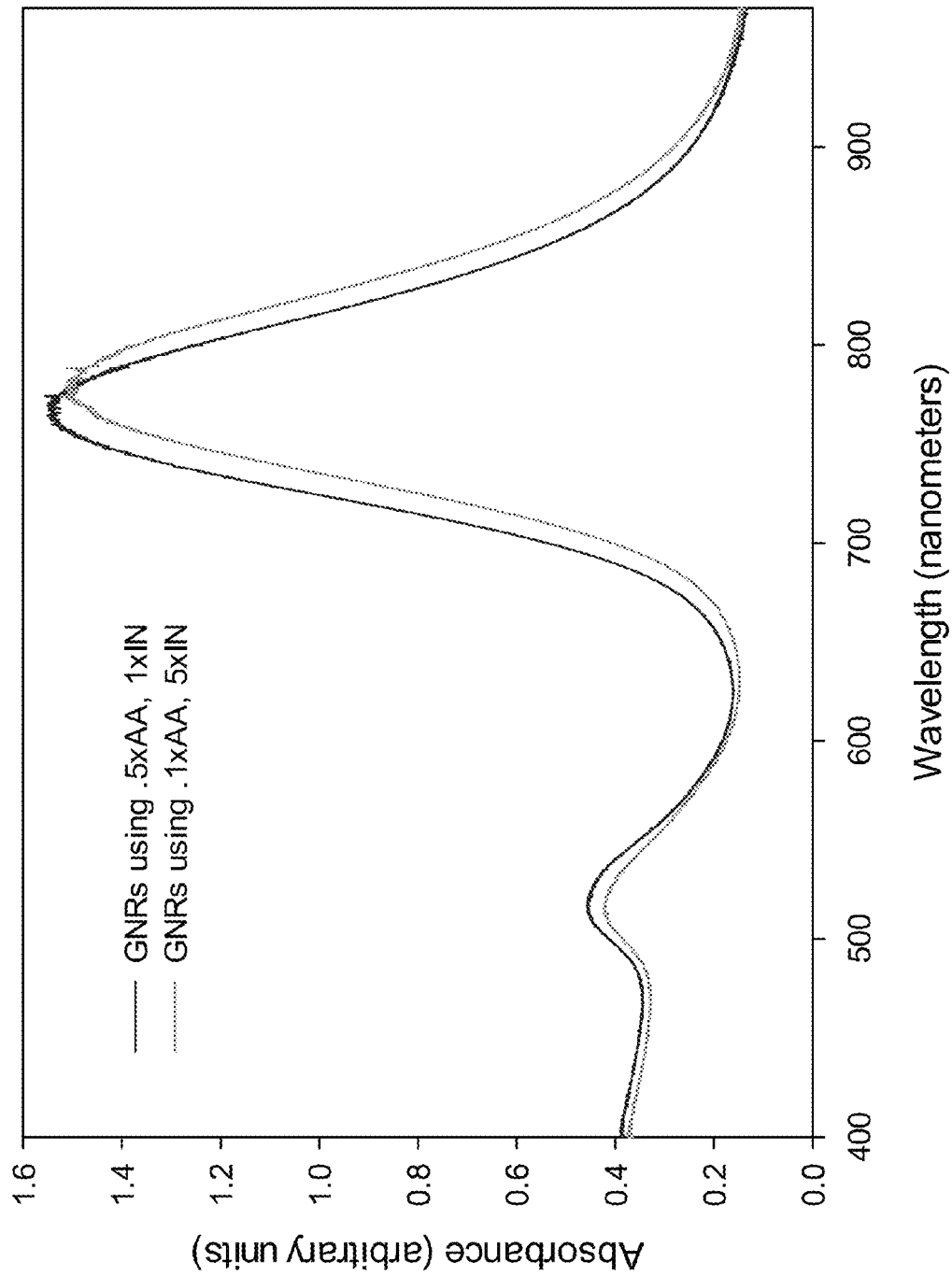
FIG. 3 illustrates experimental results according to one or more experiments disclosed herein.

In one or more experiments, it was determined that there may be a rate and concentration-dependent effect on the GNR growth even though the total AA added and the duration of addition is the same. FIG. 3 shows the results of adding 0.5×AA at the 1×IN rate and adding 0.1×AA at the 5×IN rate. Both of these solutions received the same amount of AA over the 5 hour and 40 minute growth period. In one or more experiments, it was determined that adding at the 0.1×AA and 5×IN requires a 4 times greater total volume of GS2 to be added than for the 0.5×AA and 1×IN setup.

Figure 4:
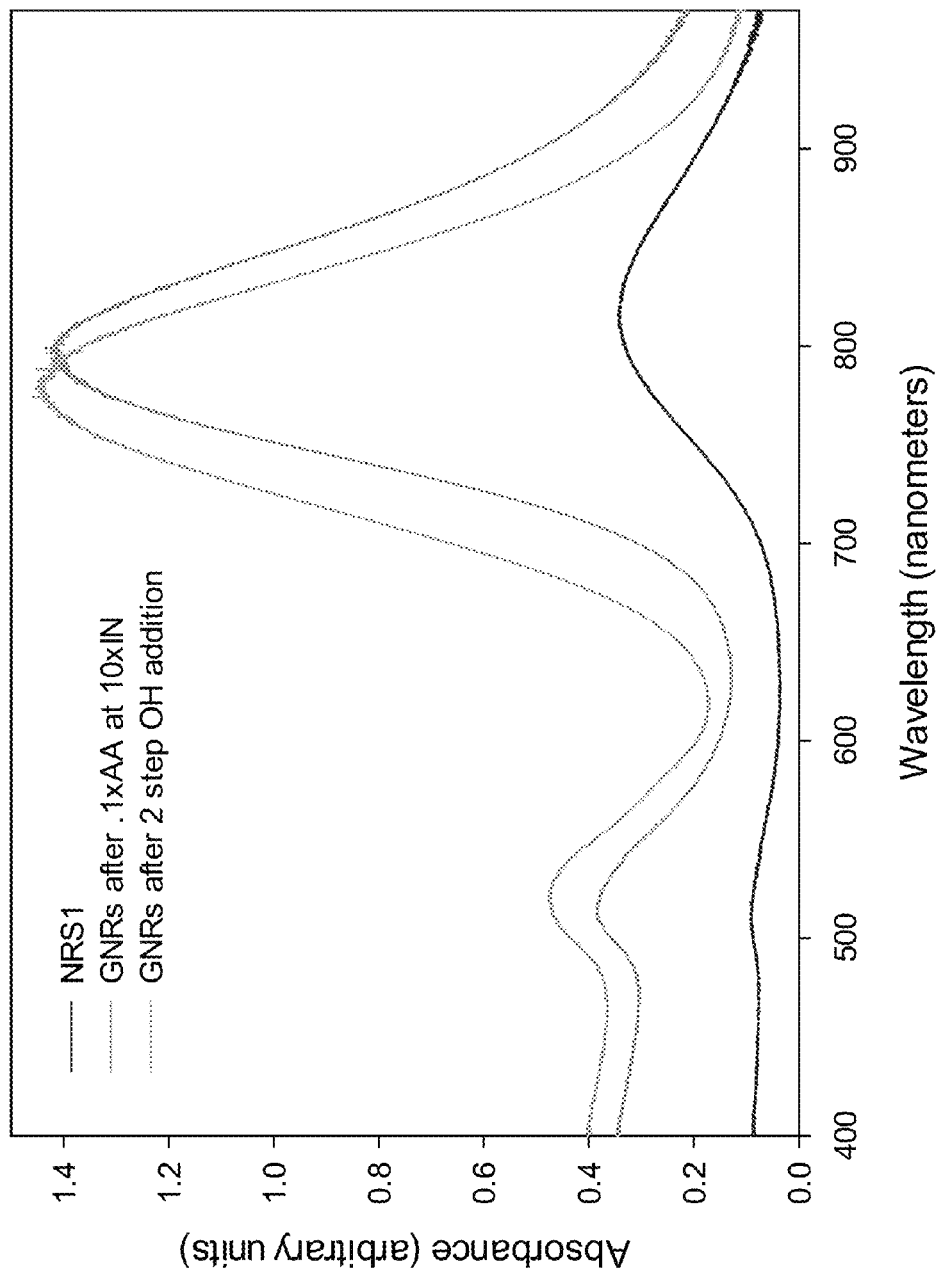
FIG. 4 illustrates experimental results according to one or more experiments disclosed herein.

In one or more experiments, it was determined that additional chemicals and materials beyond AA can be injected during GP2 to enable growth of NPS1. For example, in one or more experiments, it was determined that addition of a solution of NaOH instead of a solution of AA grows the NPS1 by reacting the remaining gold and may provide more monodisperse GNRs and was shown to provide GNRDs. This may be because reduction with NaOH is driven by deprotonation of the AA that is already present, which makes it a more potent reducing agent. FIG. 4 illustrates experimental results in which growth was completed using both AA and NaOH on a 200 mL scale with the NPS1 taken from the same stock solution. The AA solution was grown using the 0.1×AA and 5×IN specification, while the NaOH solution was injected at two different rates. A 11 mL solution of NaOH, such that 1 mL of this solution contained an equimolar amount of NaOH to the AA that was added into GS1, was added to NPS1 using a program that varied the addition rate: (1) 1 mL of this solution was added at a rate of 5.55 microliters/minute for about 3 hours, and then (2) 10 mL of this solution was added at a rate of 28 microliters/minute for about 6 hours. These one or more steps occurred in less than about 9 hours. The time may be further reduced; for example, (1) 1 mL of this solution may be added at a rate of 16.65 microliters/minute for about 1 hour, and then (2) 10 mL of this solution may be added to this solution at a rate of 56 microliters/minute for about 3 hours. TEM images of GNRDs from NaOH addition are shown in FIGS. 27A, 27B, and 27C.

Figure 5:
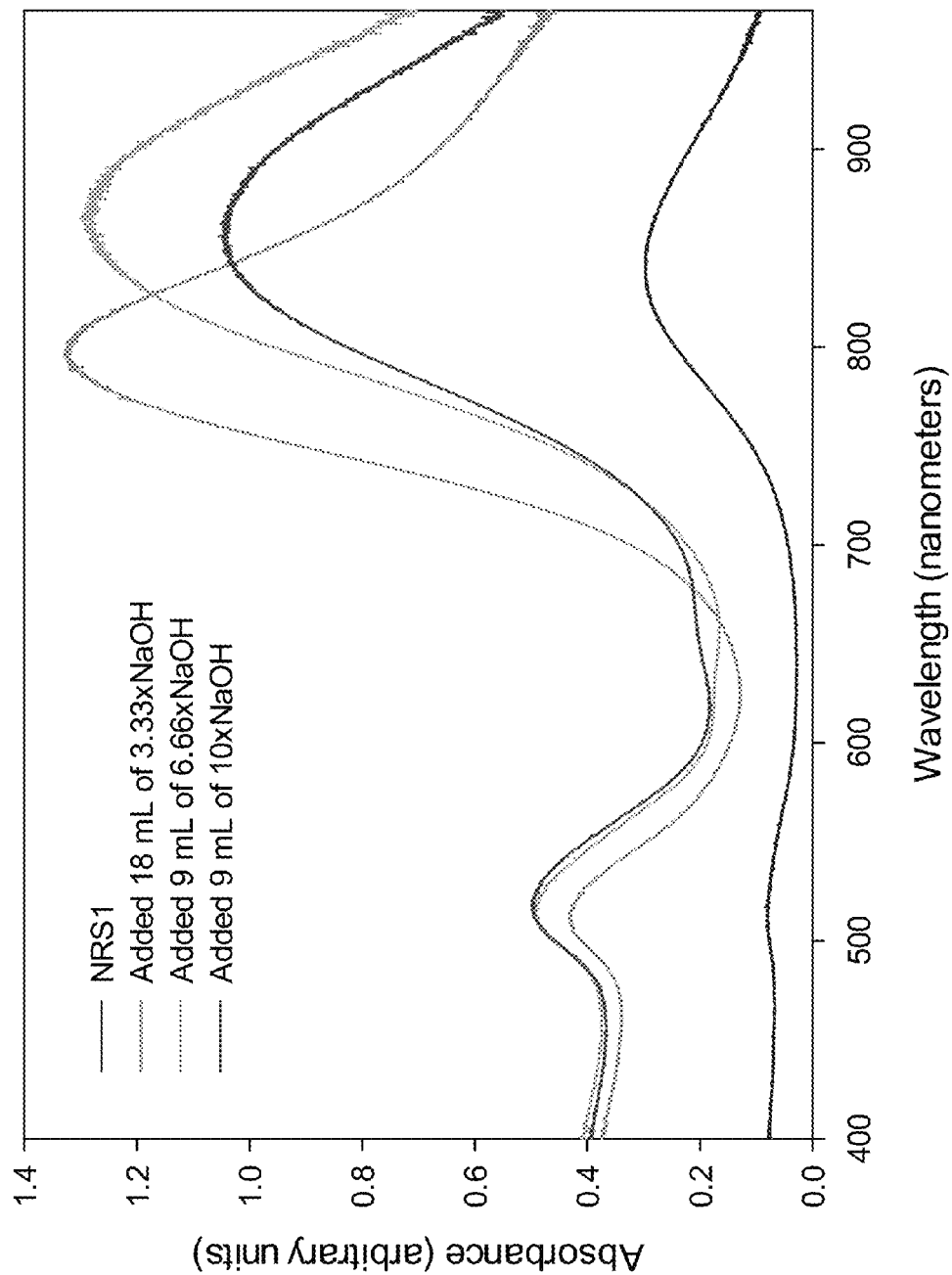
FIG. 5 illustrates experimental results according to one or more experiments disclosed herein.

In one or more experiments, growth may be commenced by quickly adding 1 mL of NaOH, corresponding to Step 1 in the immediately preceding paragraph, to NPS1 in a single step, before reducing the growth rate of the remaining 10 mL added to 28 microliters/minute for about 6 hours. This modification effectively converts this into a process that uses only one step of continuous addition of NaOH. In one or more experiments, it was demonstrated that there is a rate and/or NaOH concentration dependence in the peak shift, which can shift the peak in either direction. FIG. 5 shows this result. In these one or more experiments, it is believed that the single step process will produce GNRs when the absorbance peak shifts towards shorter wavelengths and GNRDs when the absorbance peak shifts towards longer wavelengths.

Figure 6:
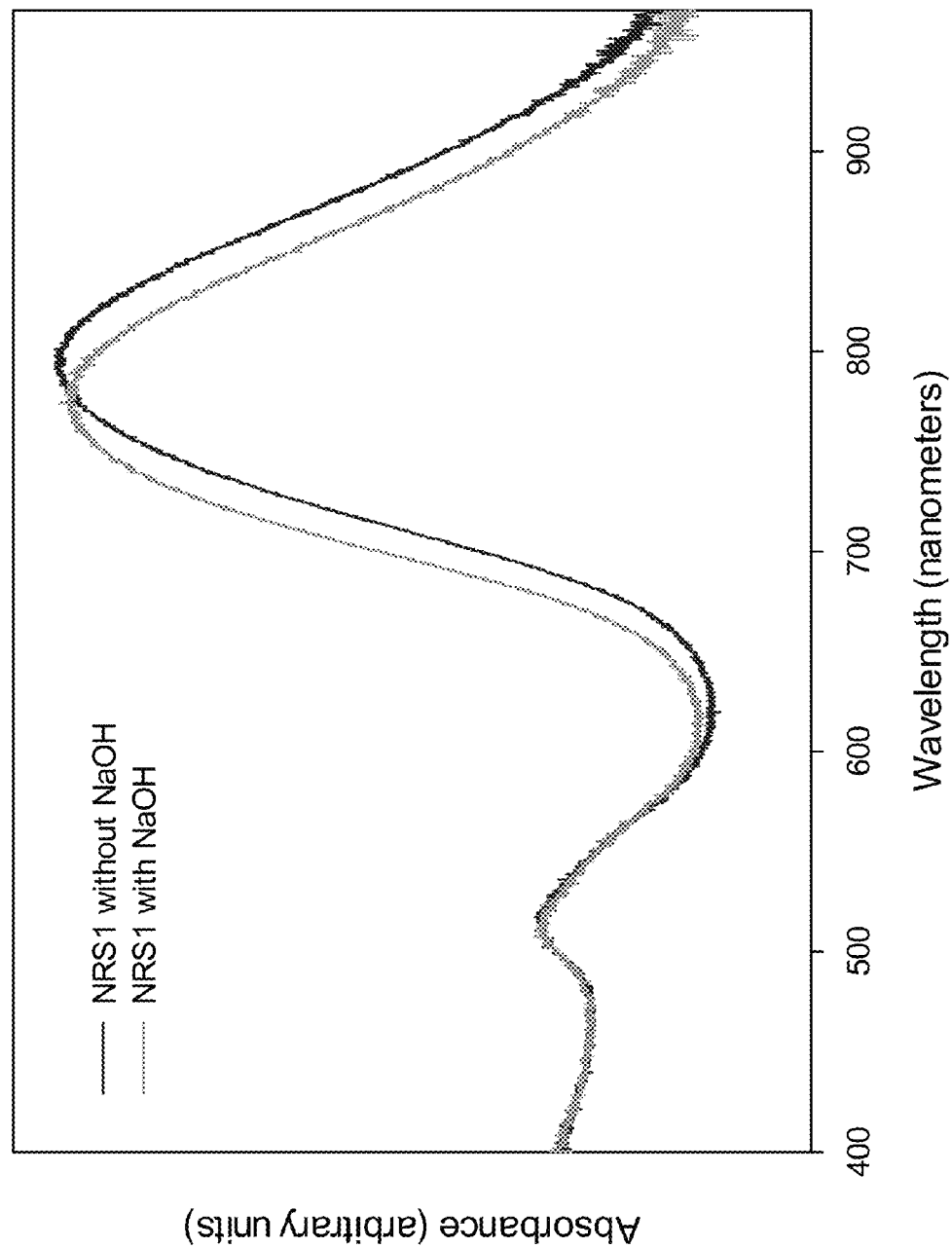
FIG. 6 illustrates experimental results according to one or more experiments disclosed herein.
Figure 7:
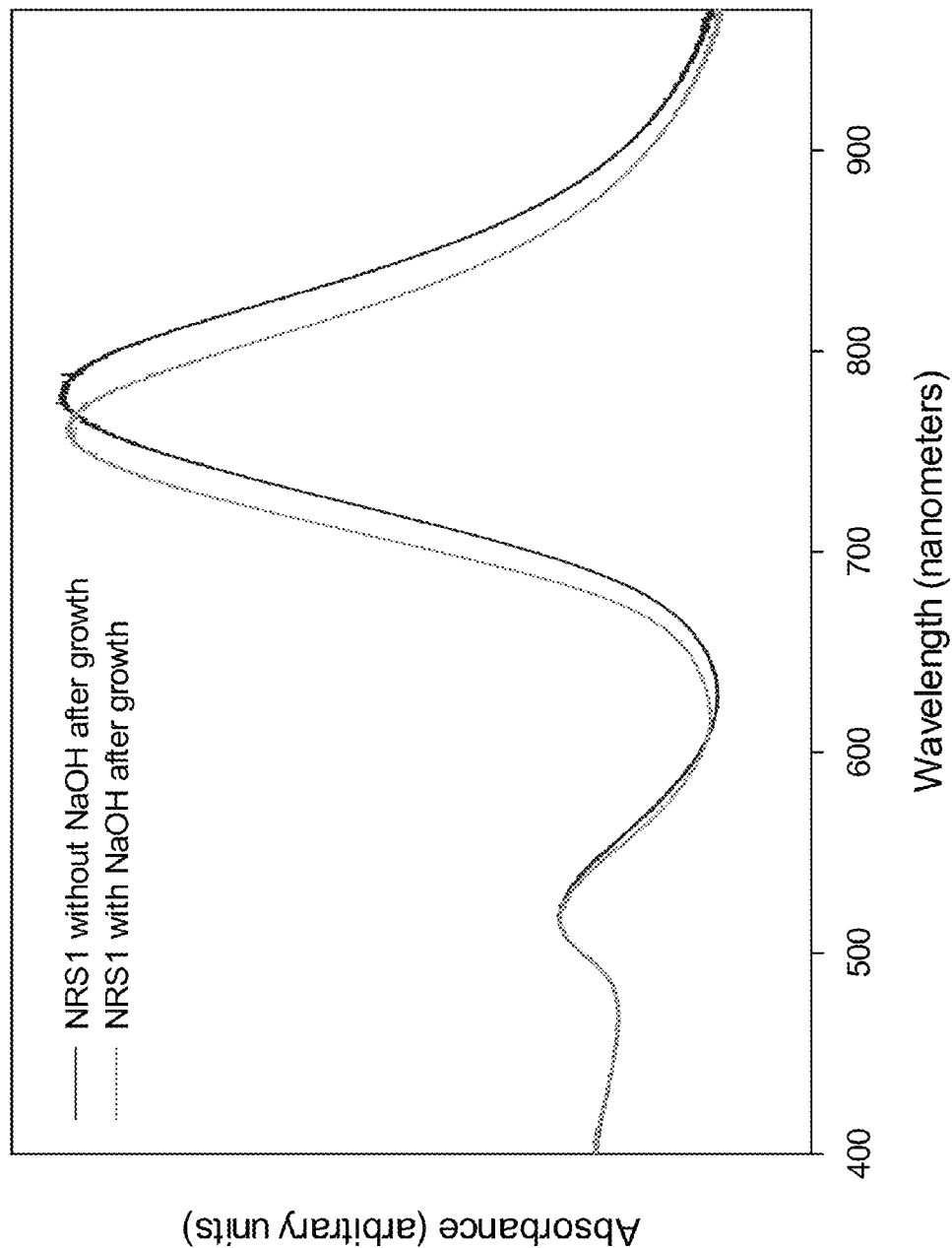
FIG. 7 illustrates experimental results according to one or more experiments disclosed herein.

In one or more experiments, it was determined that adjusting the pH of the solution with addition of NaOH (equal to the moles of AA used in GS1; has to be added first to the AA solution that is then added into GS1 during sample preparation) to GS1 may change the optical properties and shape of NPS1. This is indicated by a blueshift in the absorbance. After slight shape change and variation in optical properties, the blueshift is generally maintained after GP2 procedure using AA for growth, as illustrated in FIG. 6 and FIG. 7. In these one or more experiments, it was therefore demonstrated that by adding base and tuning the pH, the initial shape of GNRs in NPS1 can be altered to a desired shape and the desired shaped is maintained, along with peak shift, into the final GNRs through GP2.

In one or more embodiments, adjusting the pH of GS1 by adding NaOH may be integrated with the step of adding 10 mL of NaOH solution at a rate of 28 microliters/minute for about 6 hours, which would be initiated right after growth of NPS1.

Figure 31:
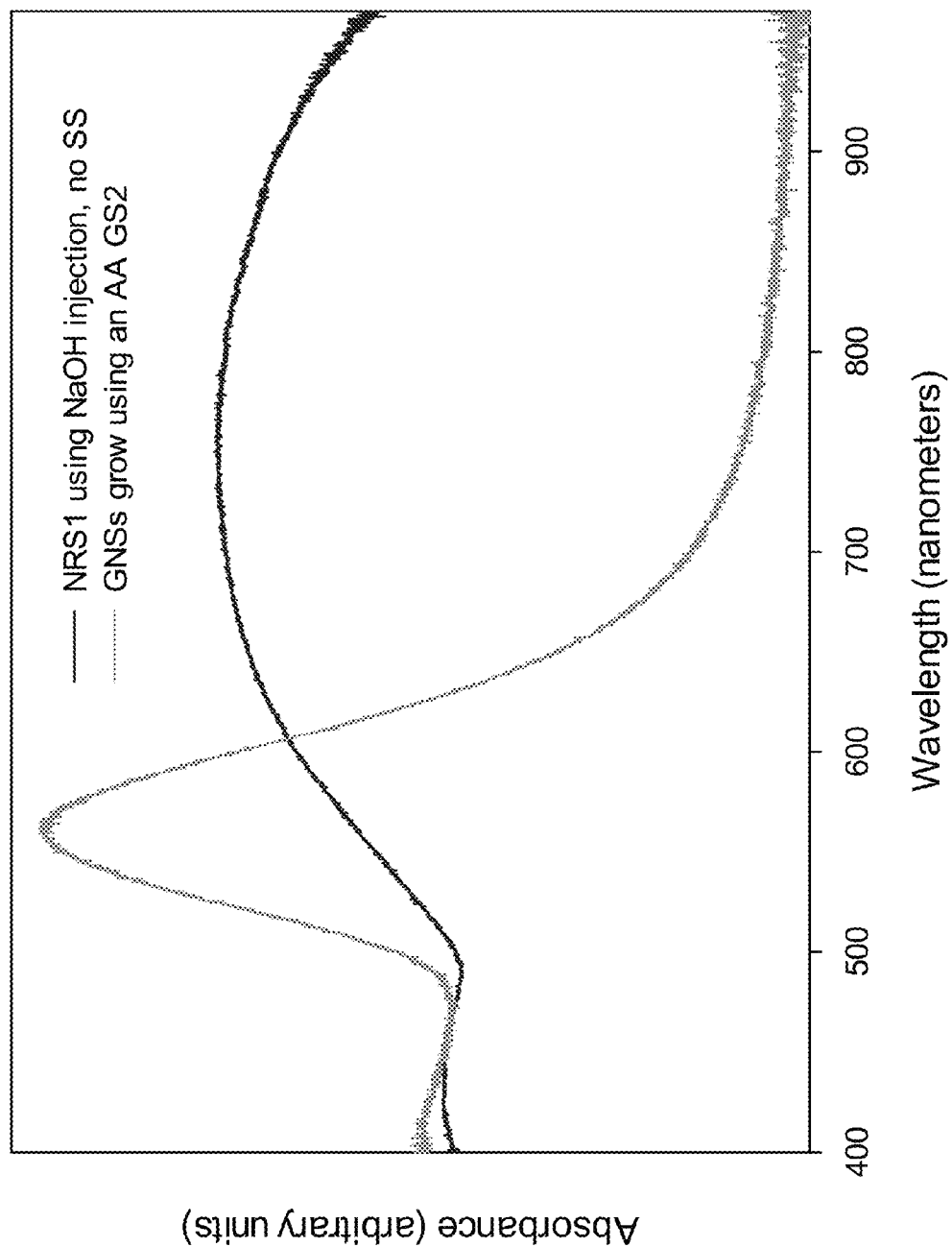
FIG. 31 illustrates experimental results according to one or more experiments disclosed herein.
Figure 38B:
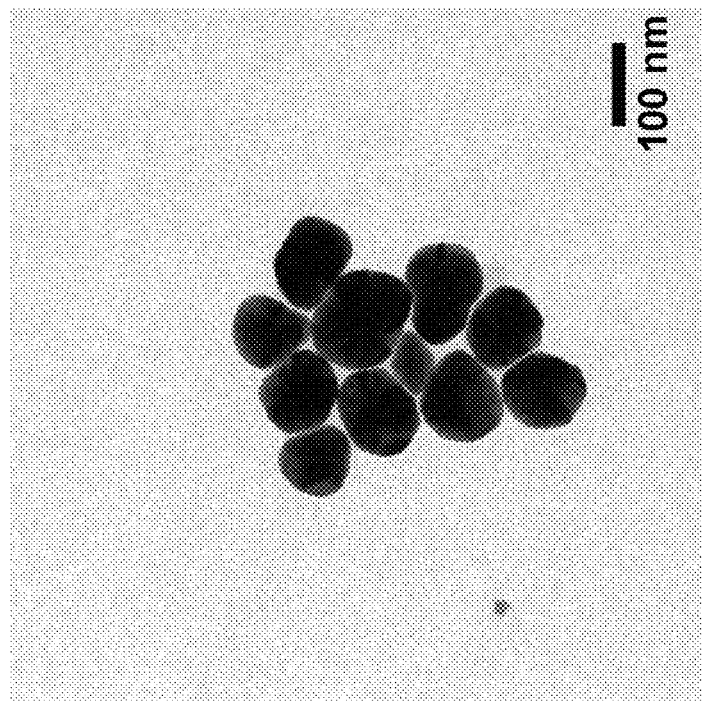
FIGS. 38A and 38B illustrate TEM images according to one or more experiments disclosed herein.
Figure 38A:
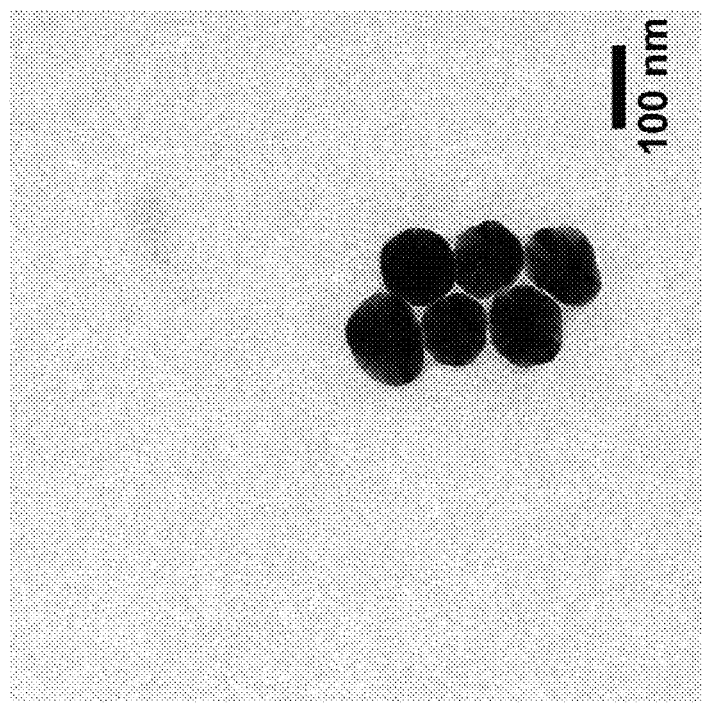
Figure 39B:
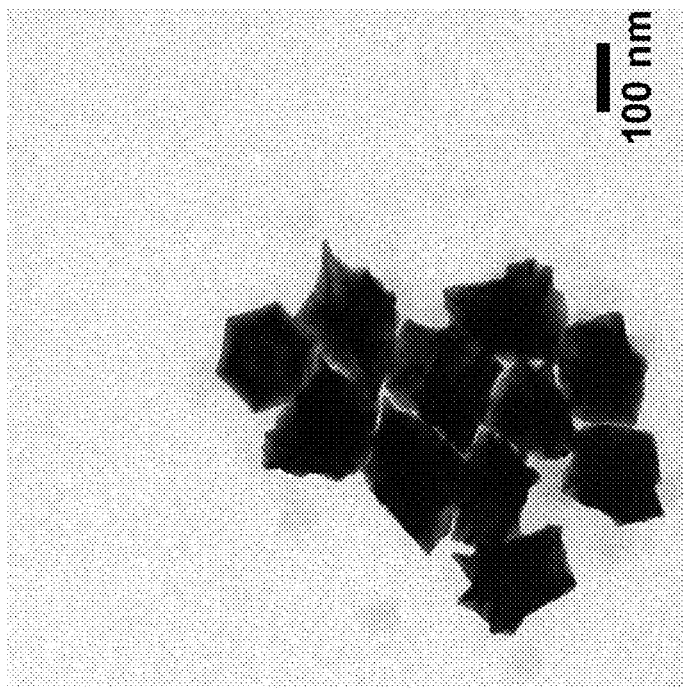
FIGS. 39A and 39B illustrate TEM images according to one or more experiments disclosed herein.
Figure 39A:
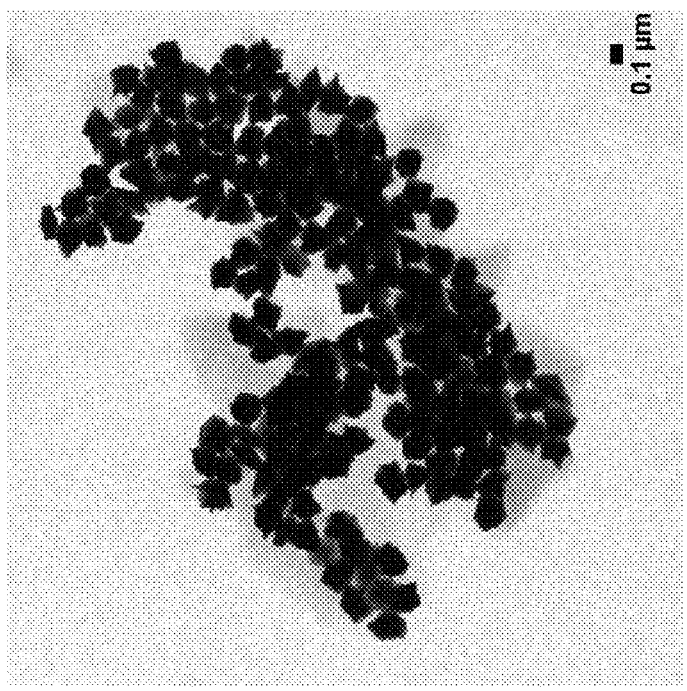

In one or more experiments, it was determined that without using SS addition into GS1 (without premade seeds or borohydride) and by using quick NaOH injection into GS1 (without any previous NaOH addition), gold NPs, specifically nanospheres, can be nucleated; these can be grown using GP2, which is evident from an optical property change. These nanoparticles are not GNRs as observed by TEM. TEM of the nanospheres produced after quickly injecting NaOH is provided in FIGS. 38A and 38B, and TEM of the GNSs grown after AA addition is provided in FIGS. 39A and 39B. It is believed that the fact that the one or more experiments produced these particles using GP2 indicates that any shape of gold seeds, or hypothetically other metal, in a surfactant system, such as CTAB, BDAC, or potentially any other similar surfactant system using GP2, can be grown. Absorbance spectra of the GNSs grown using NPs nucleated via quick NaOH injection may be similar to that of GNSs illustrated in FIG. 31.

Figure 8:
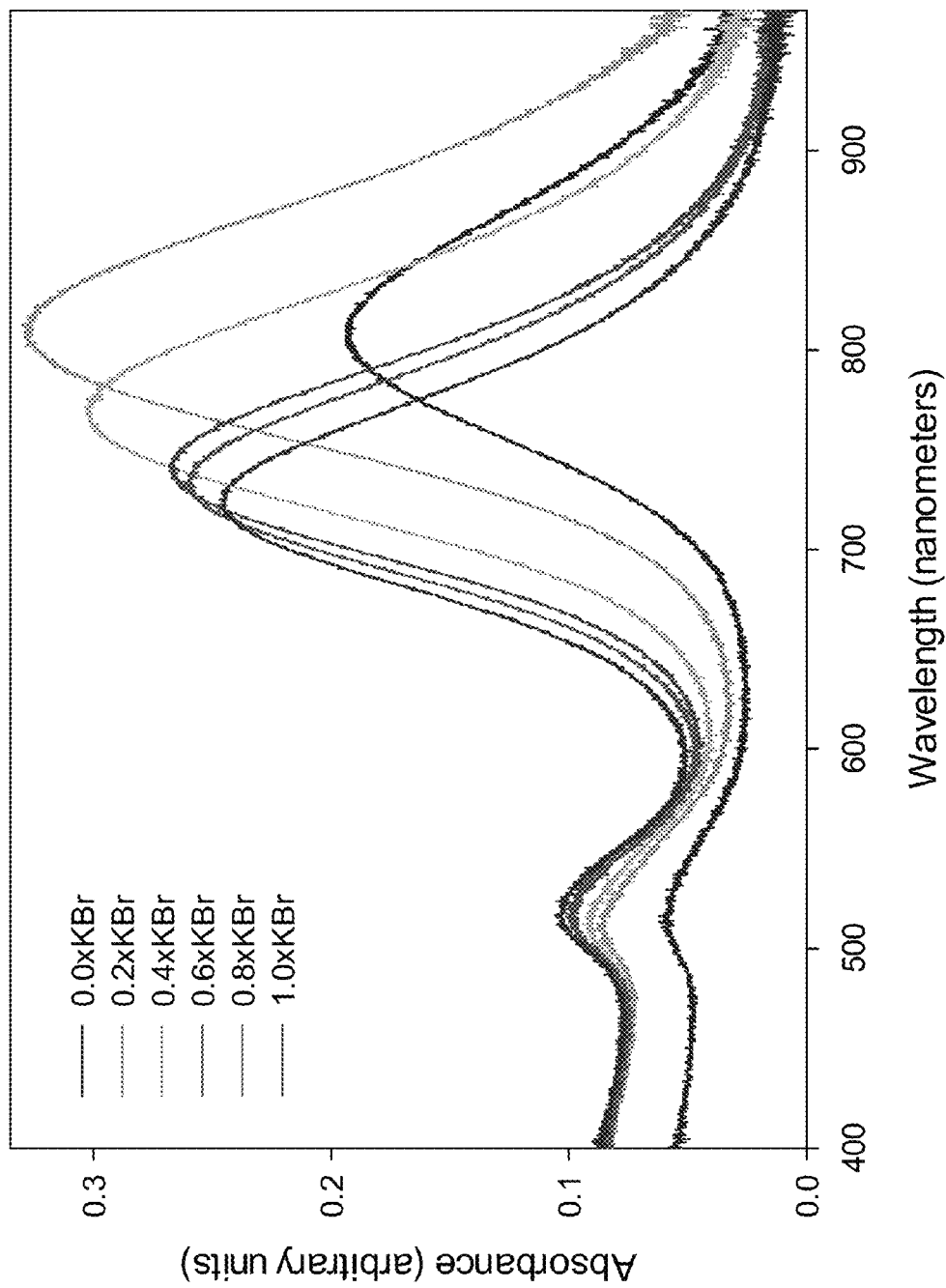
FIG. 8 illustrates experimental results according to one or more experiments disclosed herein.

In one or more experiments, it was determined that adding increasing amounts of KBr to GS1, where 1×KBr indicates an amount of KBr with an equal number of moles to that of CTAB in GS1, the longitudinal surface plasmon resonance absorption peak of NPS1 can be shifted increasingly toward shorter wavelengths. Experimental results are illustrated in FIG. 8. Accordingly, adding KBr may reduce the sensitivity of the reaction to impurities in the CTAB by providing excess bromide. In the one or more experiments, an initial experiment included doubling the gold precursor, silver precursor, and AA concentrations while keeping the CTAB concentration constant in GS1. It was also determined that addition of moderate amounts of KBr improves reproducibility and sample integrity by reducing the number of undesired, non-rod-shaped particles. Addition of greater amounts of KBr may modify GP1 to provide NPS1s having GNRs of variable aspect ratios. Coupled with GP2, this effect may also be used to modify the GNR shape and optical properties.

Figure 9:
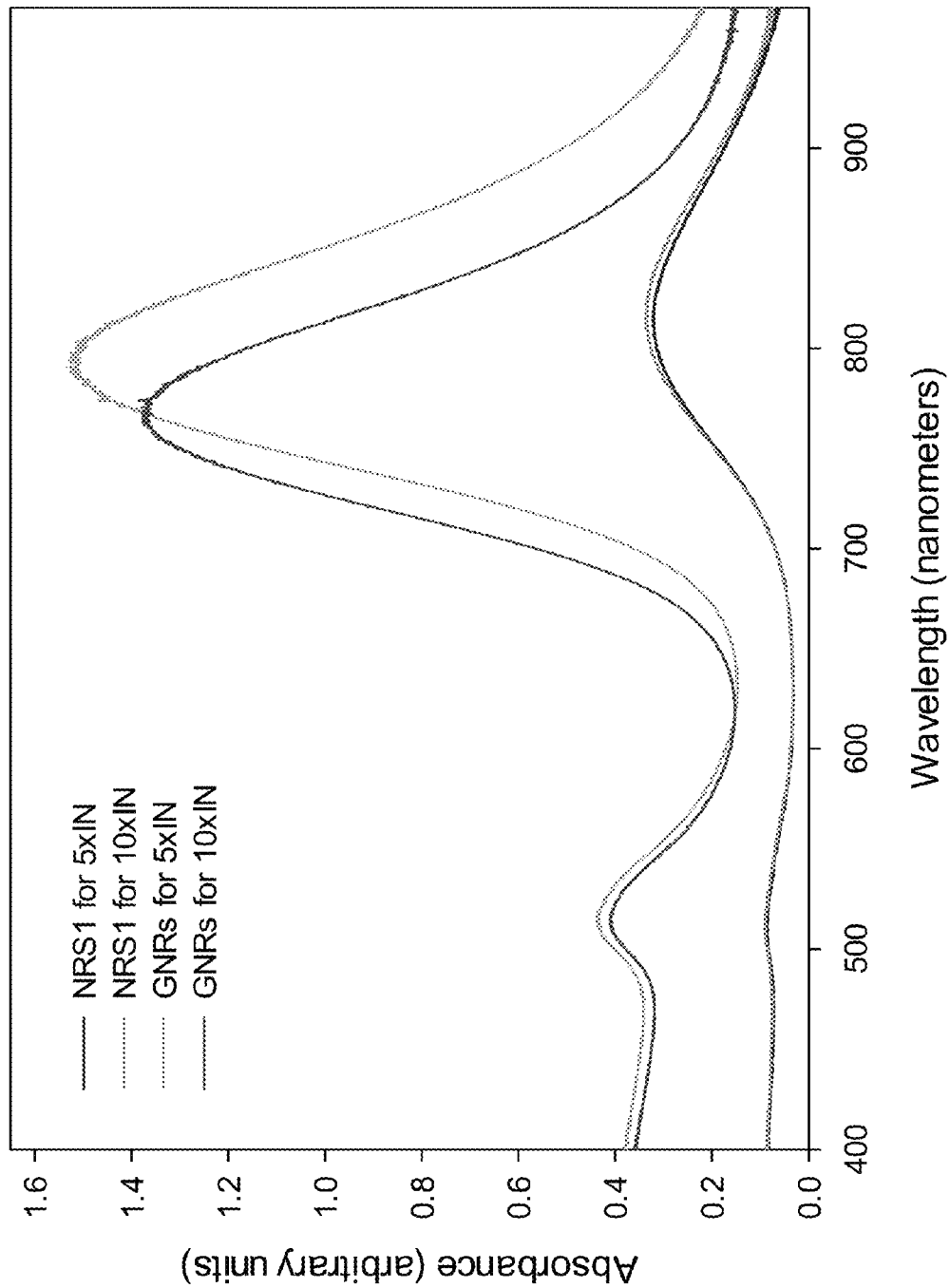
FIG. 9 illustrates experimental results according to one or more experiments disclosed herein.

In one or more experiments, the solutions were grown with AA during GP2, of which the best example is growth of solutions containing 0.2×KBr, illustrated in FIG. 9. These one or more experiments may have optimized the 800 nm GNR synthesis, and may include addition of 0.2×KBr. It is believed that about 0.2×KBr should be utilized in almost all syntheses utilizing AA or NaOH during GP2, as the one or more experiments have produced improved sample quality. TEM images of these particles are shown in FIGS. 28A and 28B and FIGS. 29A and 29B.

Figure 10:
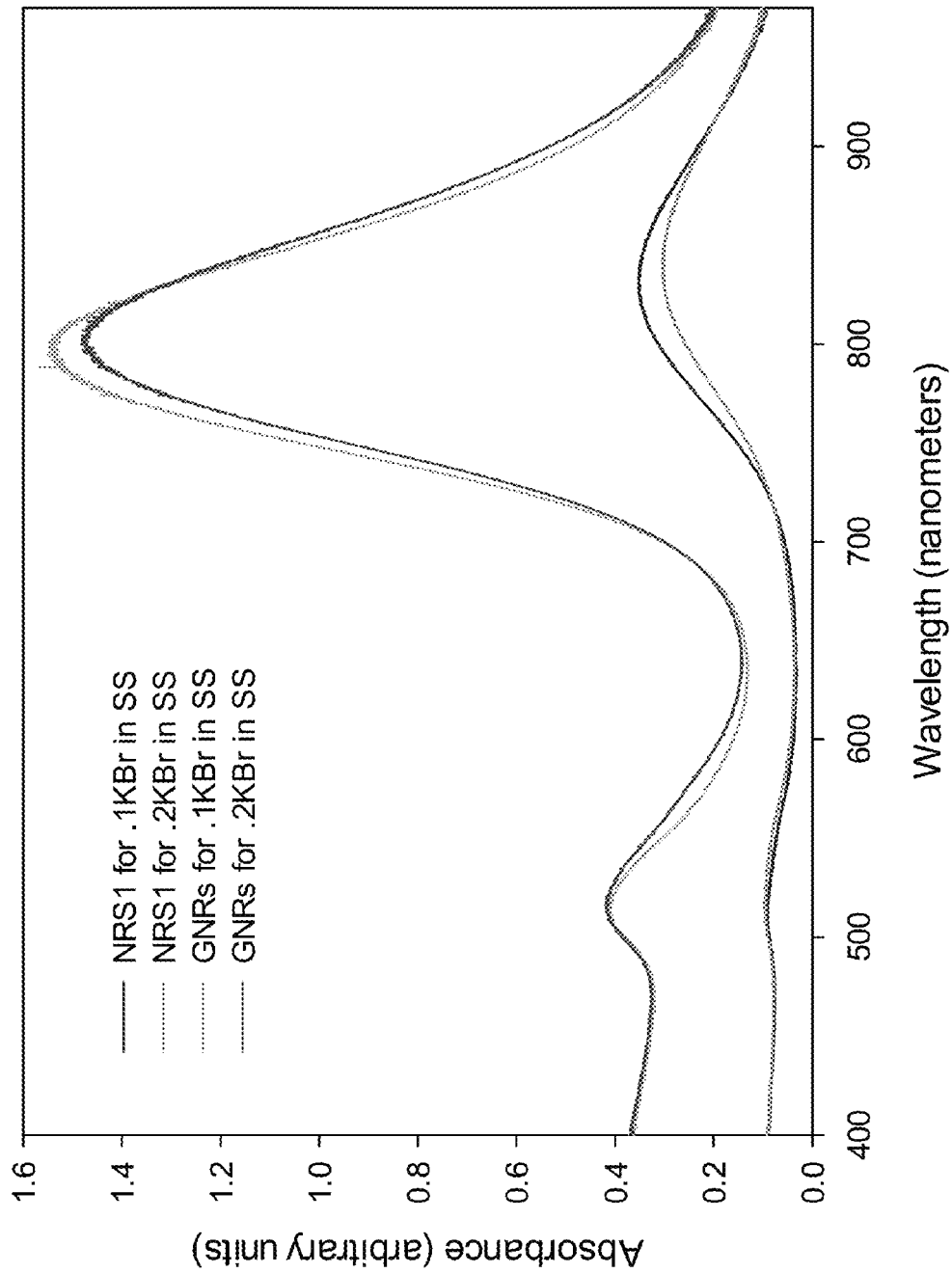
FIG. 10 illustrates experimental results according to one or more experiments disclosed herein.

In one or more experiments, KBr was introduced into the SS in an effort to eliminate unintended shapes and to improve reproducibility. The one or more experiments show that KBr addition into SS, where 1×KBr denotes an amount of KBr with an equal number of moles to that of CTAB in SS, continues to improve sample reproducibility and integrity. FIG. 10 shows 800 nm GNRs produced according to the one or more experiments using 0.1×KBr in the SS and 0.2×KBr in GS1, grown at 0.1×AA and 10×IN.

Figure 11:
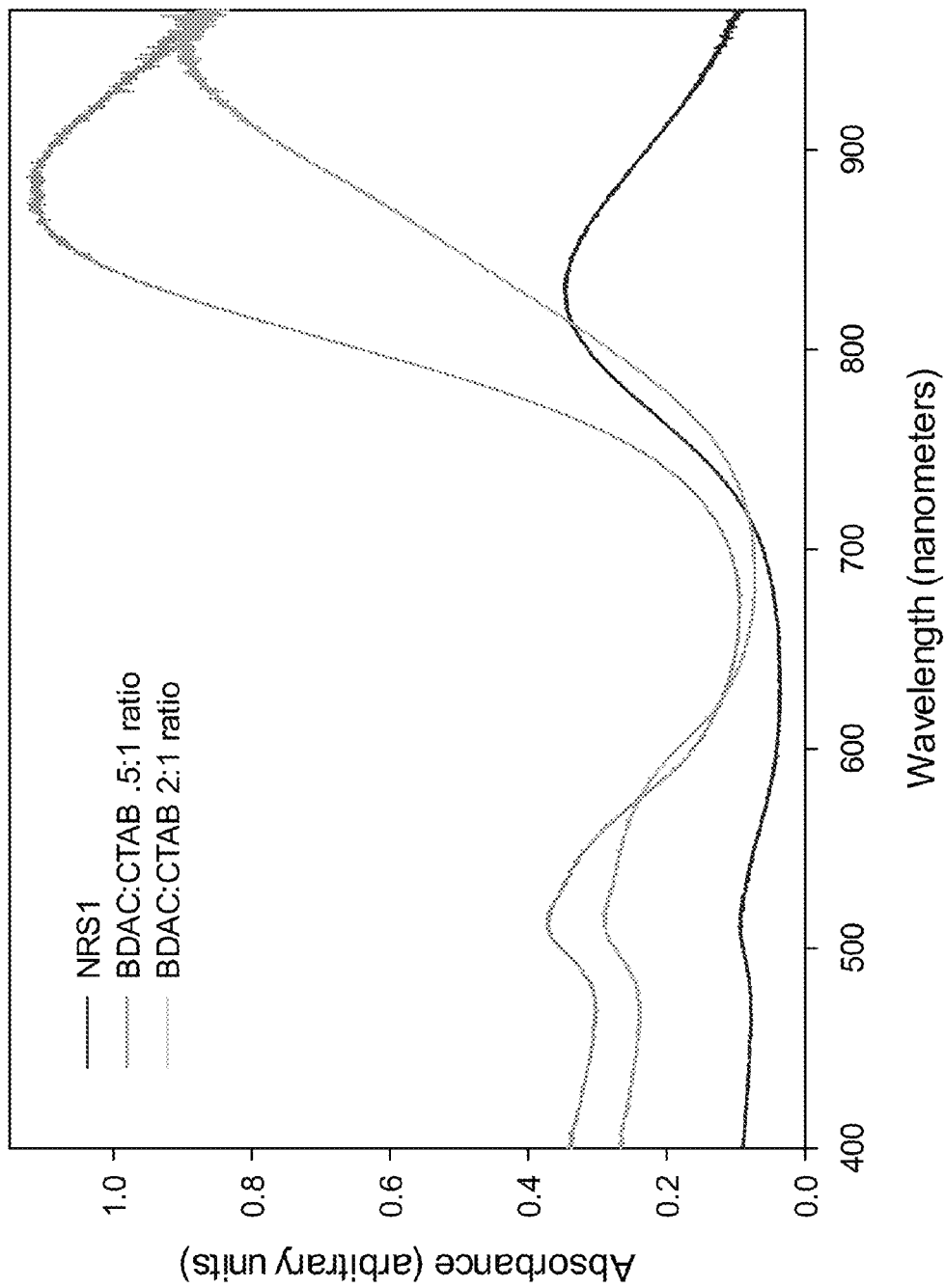
FIG. 11 illustrates experimental results according to one or more experiments disclosed herein.
Figure 12:
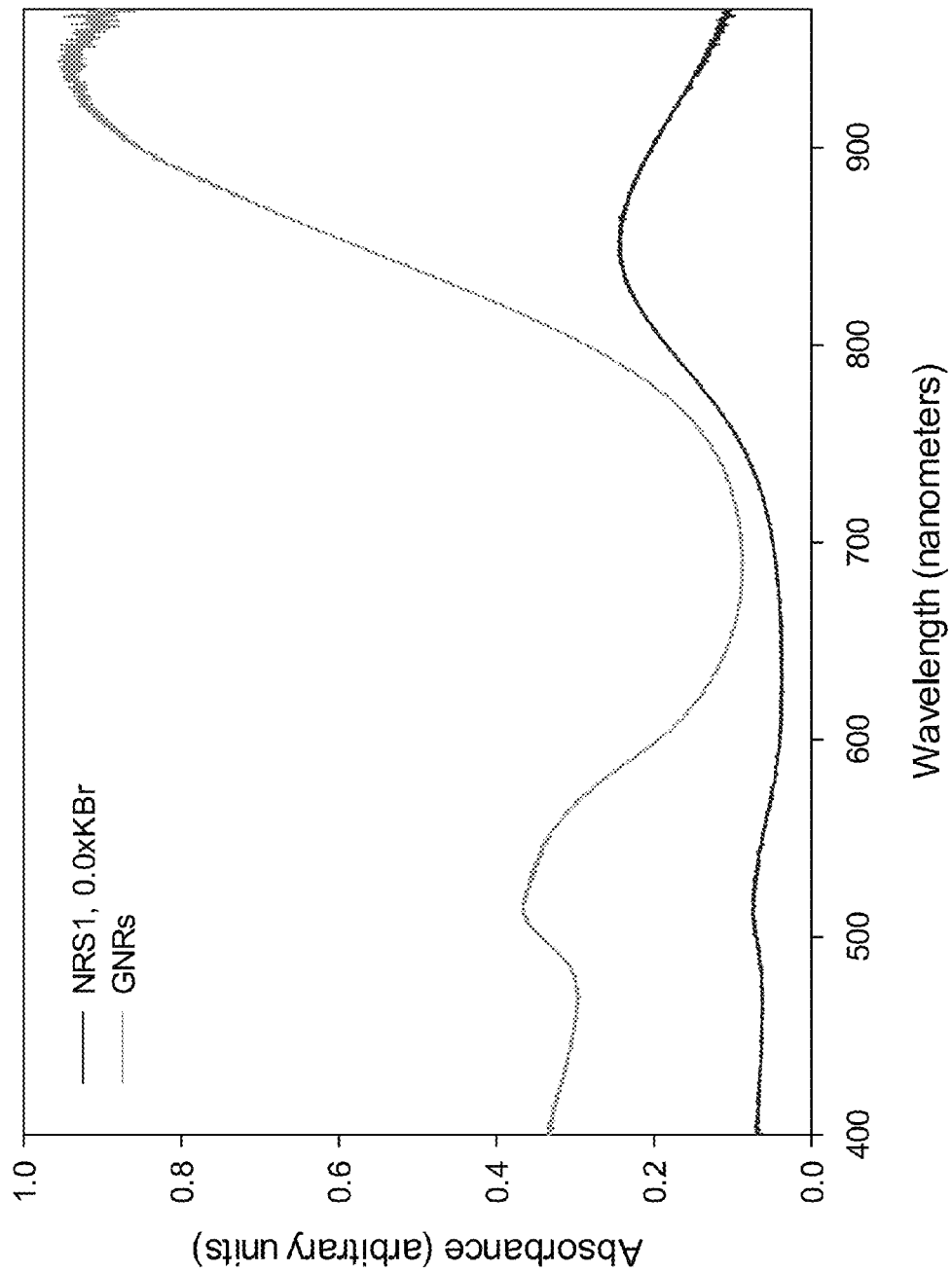
FIG. 12 illustrates experimental results according to one or more experiments disclosed herein.
Figure 13:
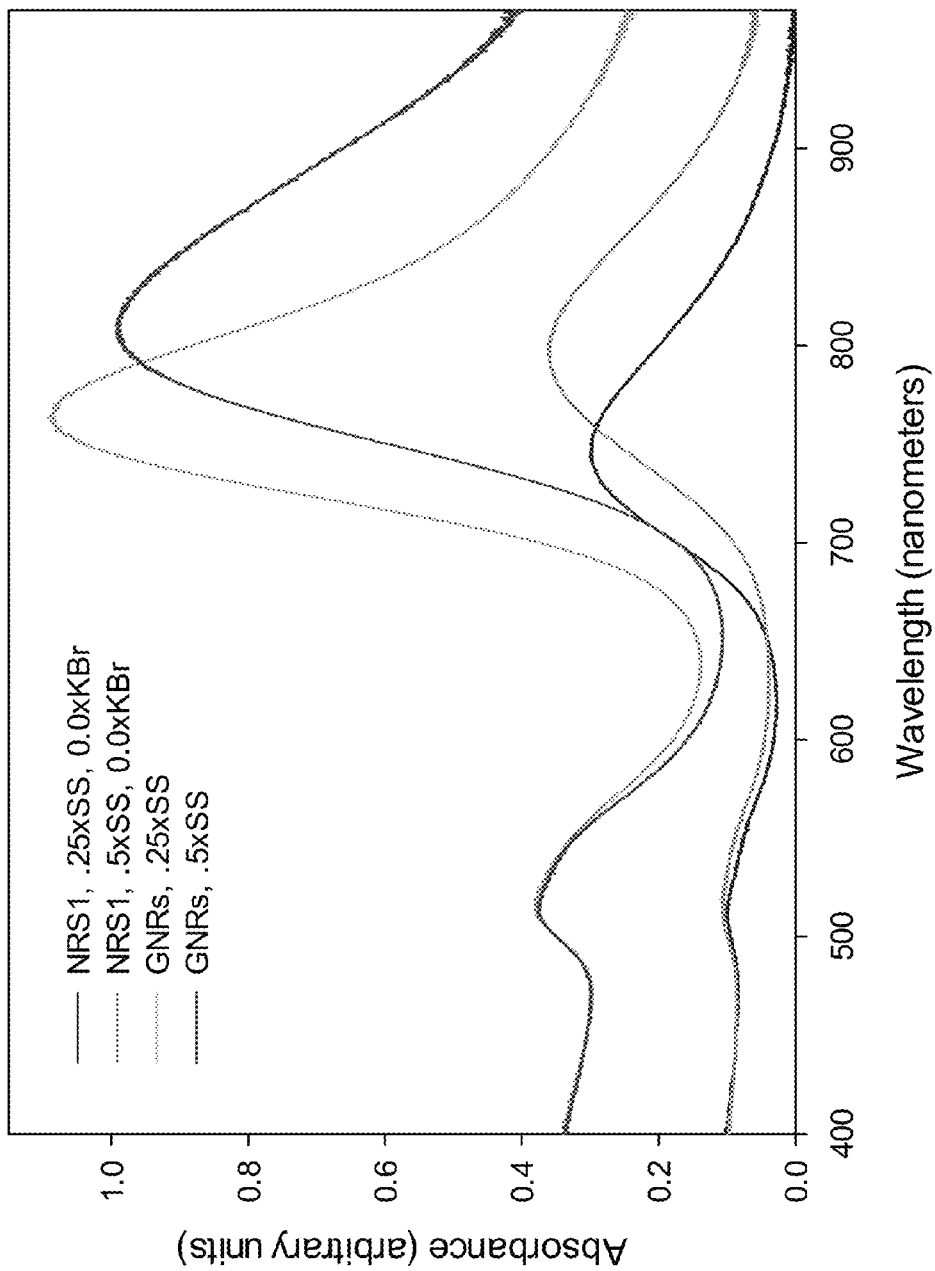
FIG. 13 illustrates experimental results according to one or more experiments disclosed herein.

In one or more experiments, it was determined that adding BDAC to NPS1, at example amounts of 0.5, 1, and 2 times the CTAB concentration in NPS1, could change the direction in which the absorbance peak shifts during AA addition. As little as 0.25×, BDAC provided just a minor shift and was very useful in keeping the CTAB soluble after the solution was complete. The peak wavelength strongly correlates with the amount of BDAC added. FIGS. 11 and 12 illustrate this effect, showing the dependence on the BDAC concentration and the AA addition rate. In one or more experiments, the addition of GS2 stopped before all of the gold precursor had reacted, which caused these NPs to deviate away from the GNR shape and slightly toward the dog-bone shape, as seen in FIGS. 30A, 30B, and 30C; however, GNRDs are obtained when reduction is performed quickly and GNRs can be obtained when performing somewhat slower reduction. Moreover, this shift into the NIR is tunable by the rate of AA addition during GP2; the slower the addition, the less the shift, which is shown in FIG. 13. FIG. 13 also shows the effect of SS concentration when using BDAC. BDAC also provides additional stabilization to the final product, such that surfactant does not precipitate out when the solution reaches room temperature.

Figure 14:
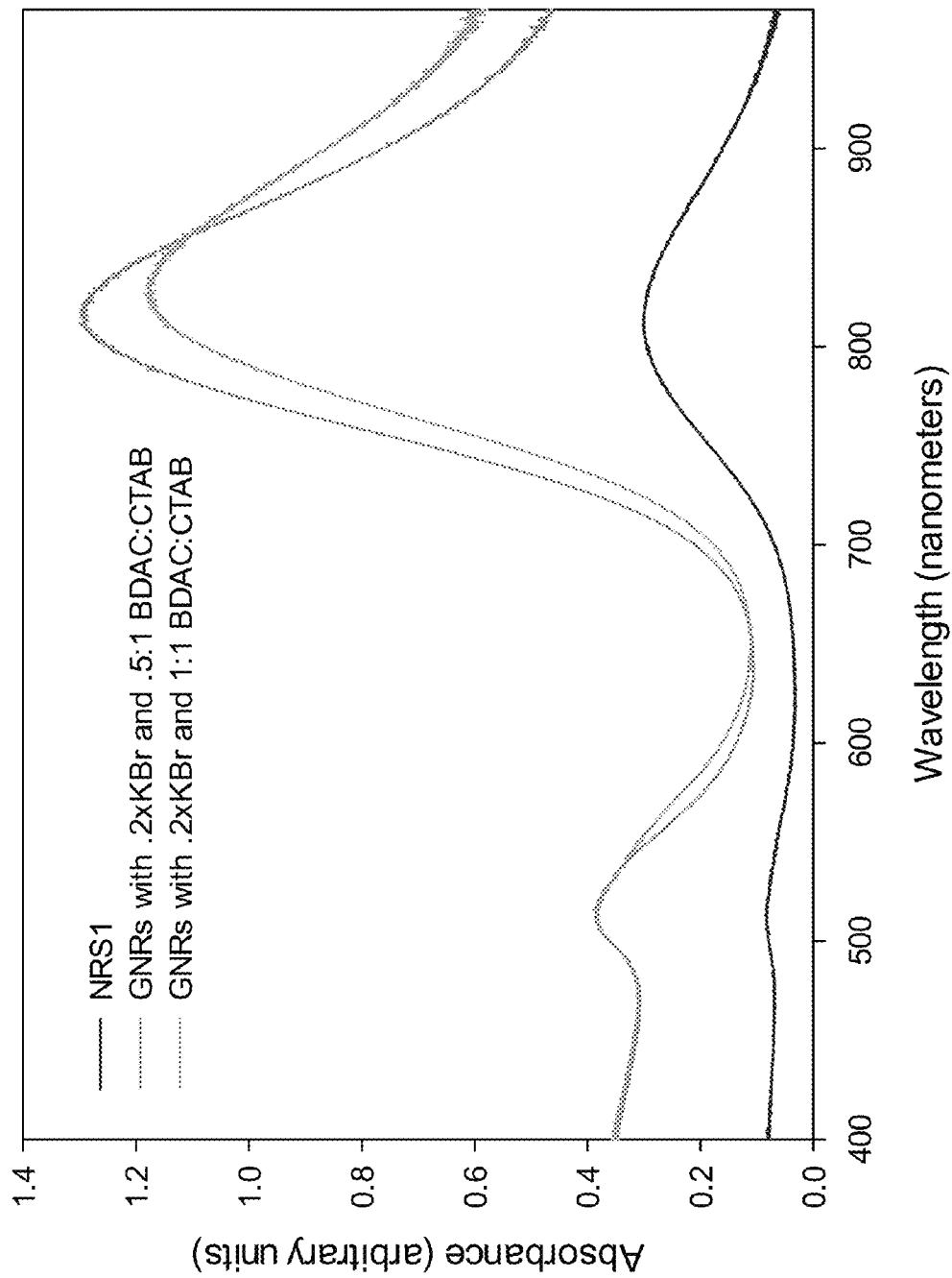
FIG. 14 illustrates experimental results according to one or more experiments disclosed herein.
Figure 15:
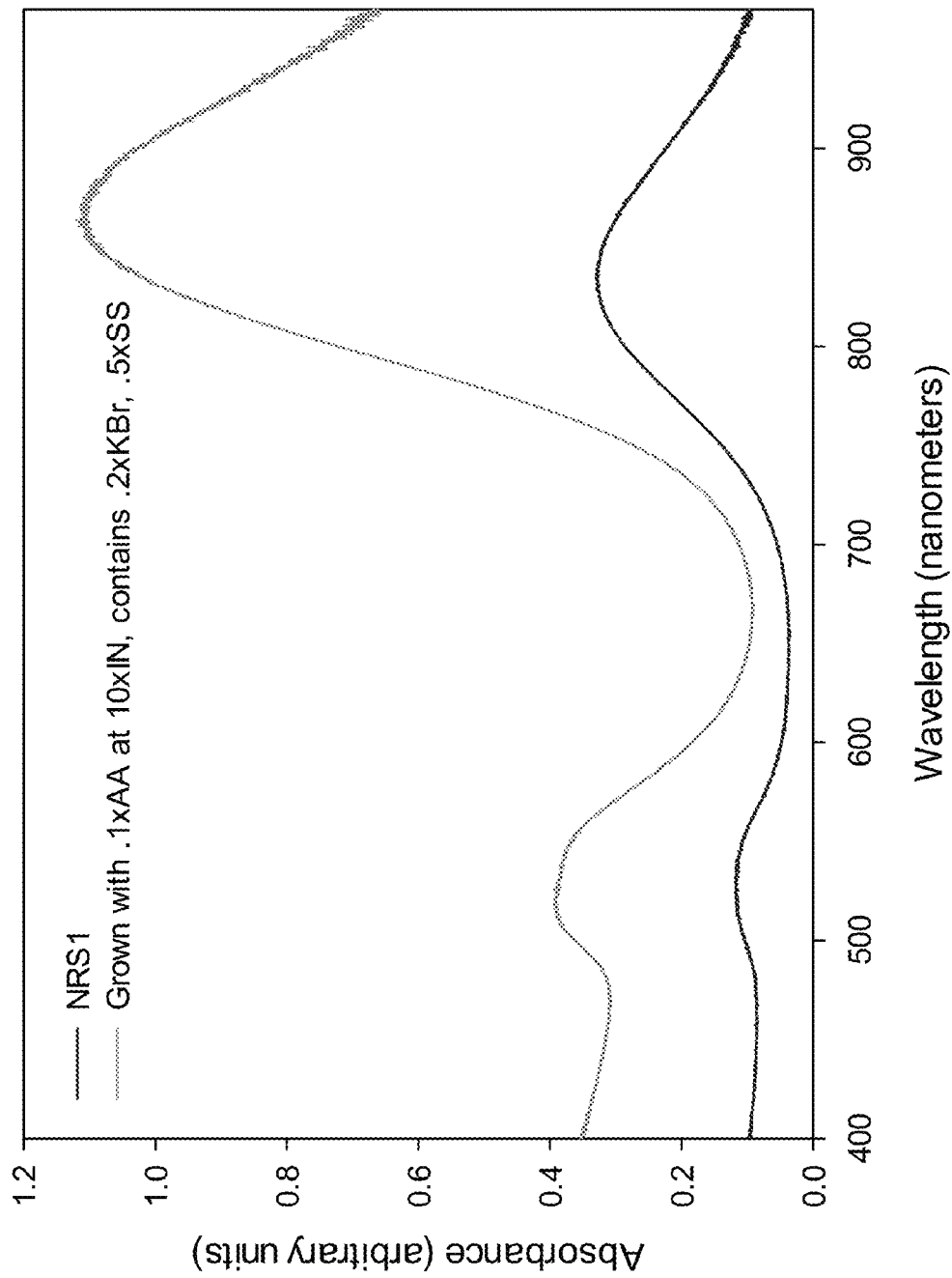
FIG. 15 illustrates experimental results according to one or more experiments disclosed herein.
Figure 32A:
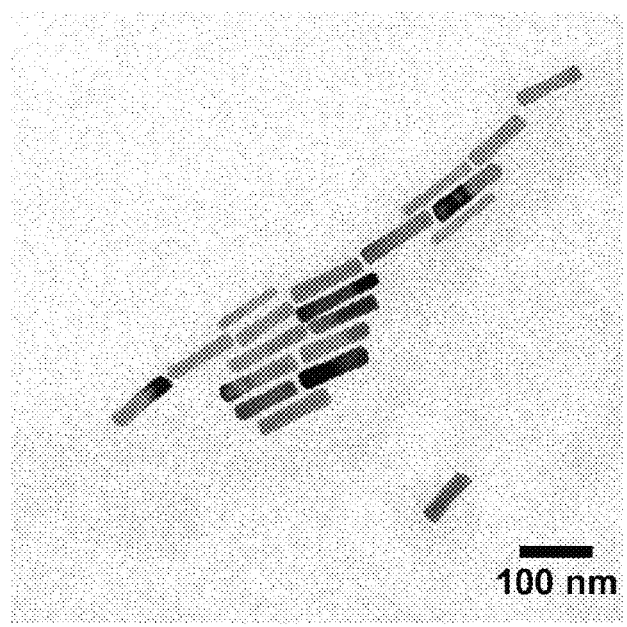
FIGS. 32A, 32B, and 32C illustrate TEM images according to one or more experiments disclosed herein.
Figure 32B:
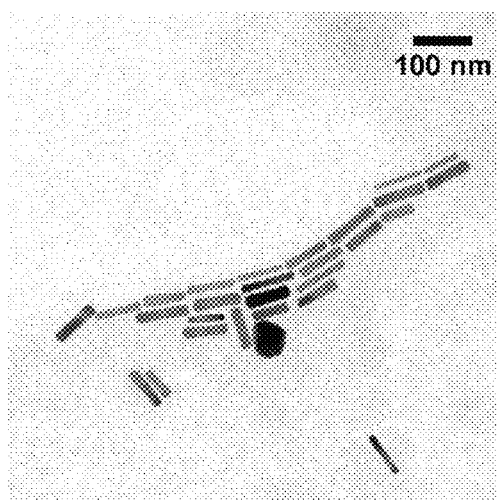
Figure 32C:
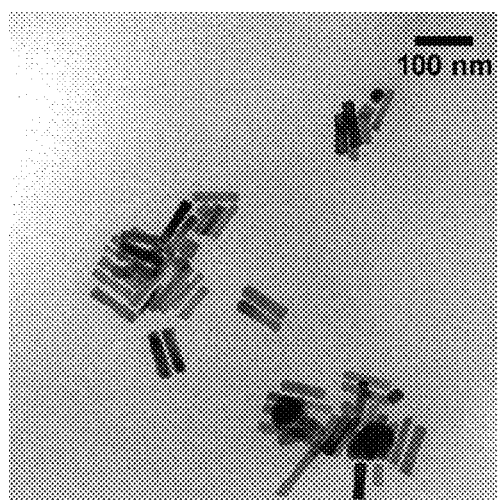

It was determined that for BDAC synthesis, in order to achieve a large shift in absorbance, substantially no KBr can be present in GS1. FIG. 14 shows the lack of shift for a solution with BDAC grown in the presence of KBr. If 0.2× KBr is present in the initial solution, which may be beneficial as it would improve the final solution quality, CTAC addition, equal to the amount of moles of KBr added, can be added in addition of BDAC to help regain mobility of the peak into the IR. However, it was determined that the regained mobility is not of the same magnitude as without KBr in GS1 initially. The effect of addition of CTAC is shown in FIG. 15. TEM for these GNRs produced using CTAC is illustrated as FIGS. 32A, 32B, and 32C.

Figure 33B:
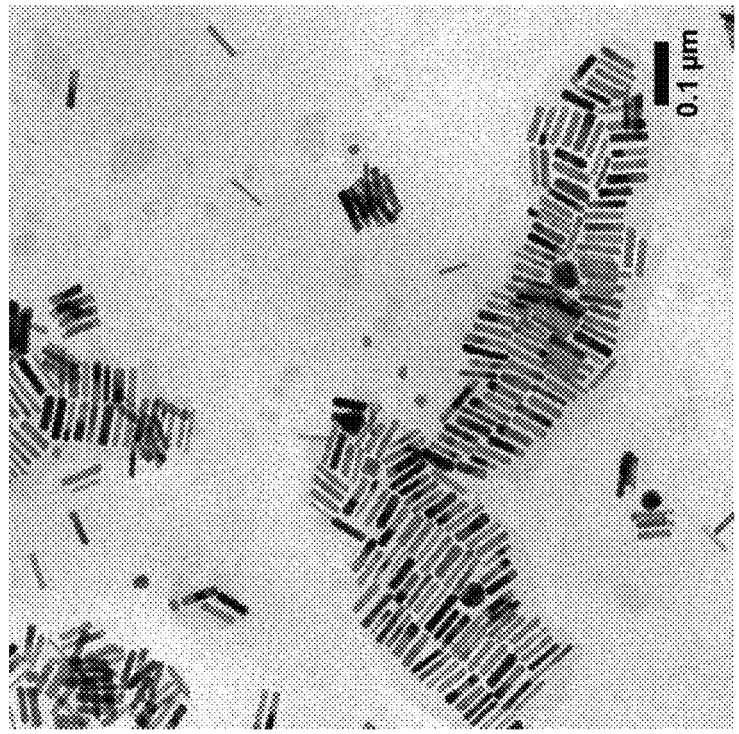
FIGS. 33A and 33B illustrate TEM images according to one or more experiments disclosed herein.
Figure 33A:
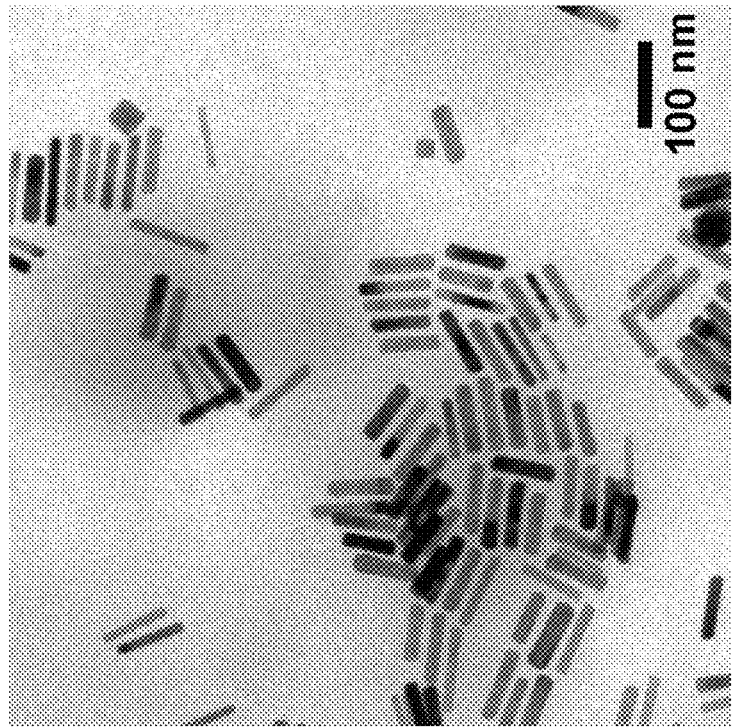

FIGS. 33A and 33B show TEM for GNRs corresponding to FIG. 11 grown with 0.5:1 BDAC:CTAB, and shows that the absorbance of GNRs can be shifted into the NIR without obtaining GNRDs. FIGS. 34A, 34B, and 34C show GNRs from FIG. 12, which has a greater shift and also slight GNRD shape formation, which indicates that the injection of GP2 will need to be slower at higher BDAC:CTAB ratios to maintain GNR shape during growth.

Figure 16:
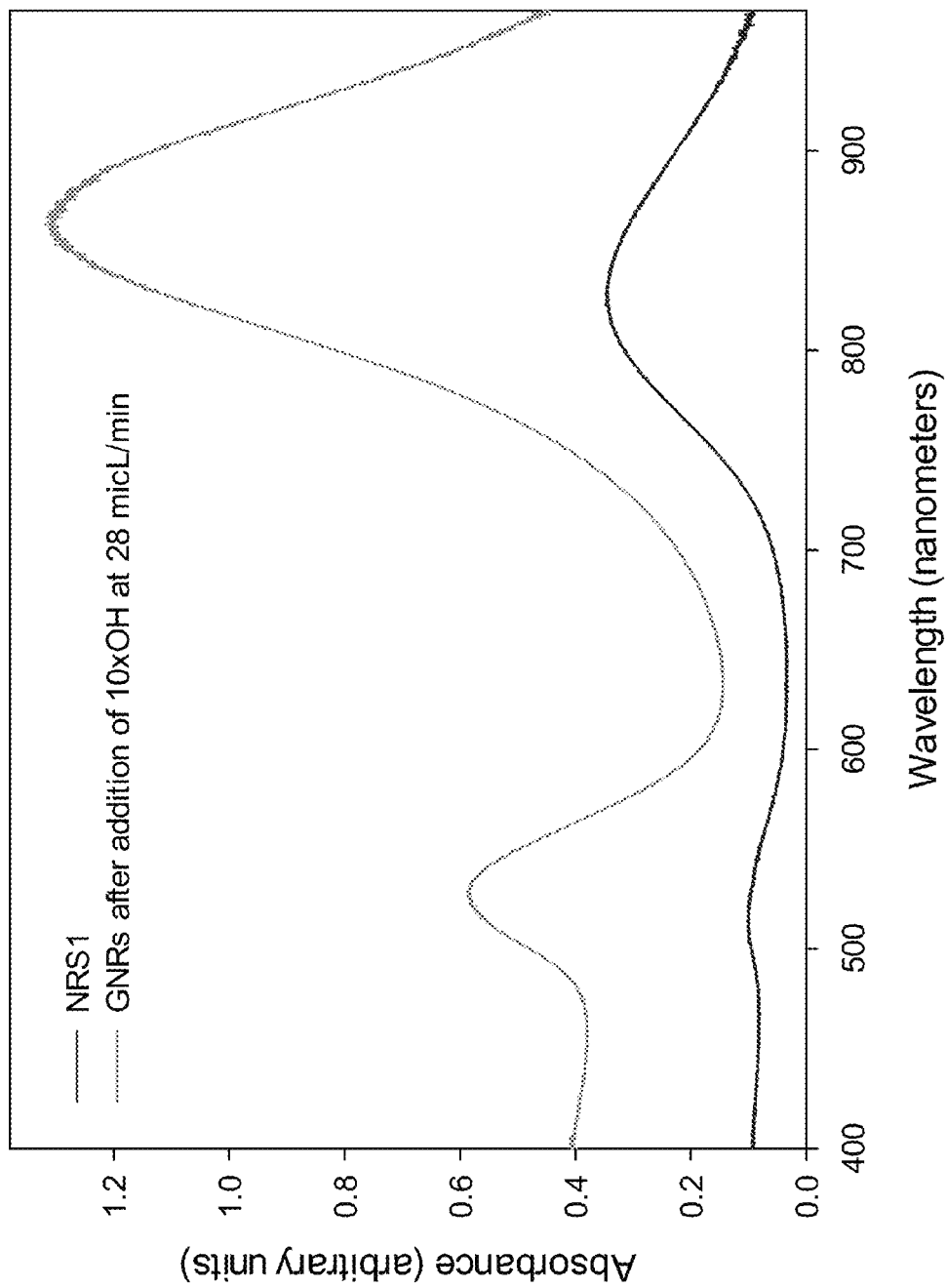
FIG. 16 illustrates experimental results according to one or more experiments disclosed herein.

In one or more experiments, it was also shown that the peak can be shifted into the NIR by addition of NaOH instead of AA during GP2, as demonstrated in FIG. 16.

One approach to making IR-absorbing GNRs may be to change formulation of the SS and remove Ag from GS1 in trying to modify this synthesis towards a method reported by Murphy. The NRS1 produced from that synthesis coupled with our GP2 may provide an approach for long, high aspect ratio (~20:1) GNRs.

In one or more methods, GNRDs may be made from GNRs in a two-step process at any point of this synthesis, with or without BDAC presence. This method may include (1) growing GNRs to a certain point through GP2, before the reaction has been completed (i.e., unreacted Au precursor remains), and (2) adding an excess of AA and/or NaOH to cause very quick reduction of the Au, which may add preferentially to the ends of the GNRs. This should be done while stirring in order to try to ensure that the peak absorbance increases but does not shift, with the end product being GNRDs.

In one or more embodiments, AA and/or NaOH could be added to a solution with unreduced Au remaining; adding excess Au quickly in parallel to the AA/NaOH addition would allow faster Au deposition, resulting in more distinct GNRD structures. Addition of Au together with AA/NaOH may be performed before or after completion of GP2.

In one or more embodiments, the addition of both NaOH and KBr into GS1 may produce highly uniform solutions that are blueshifted in comparison with solutions that would not include NaOH.

Figure 17:
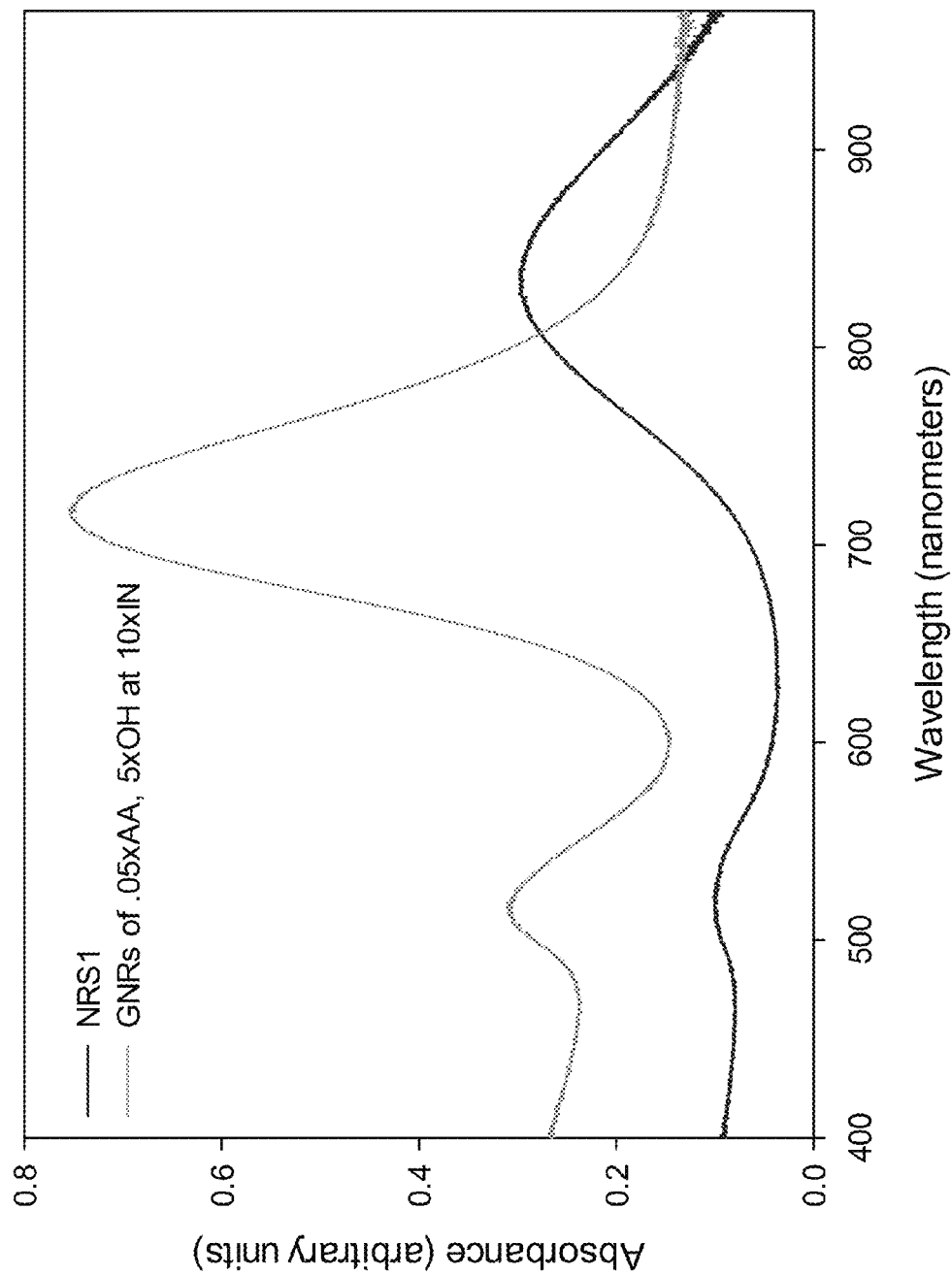
FIG. 17 illustrates experimental results according to one or more experiments disclosed herein.

In one or more experiments, the addition of both AA and NaOH in parallel into one NPS1 demonstrated that growth is possible in this manner, as shown in FIG. 17.

Figure 18:
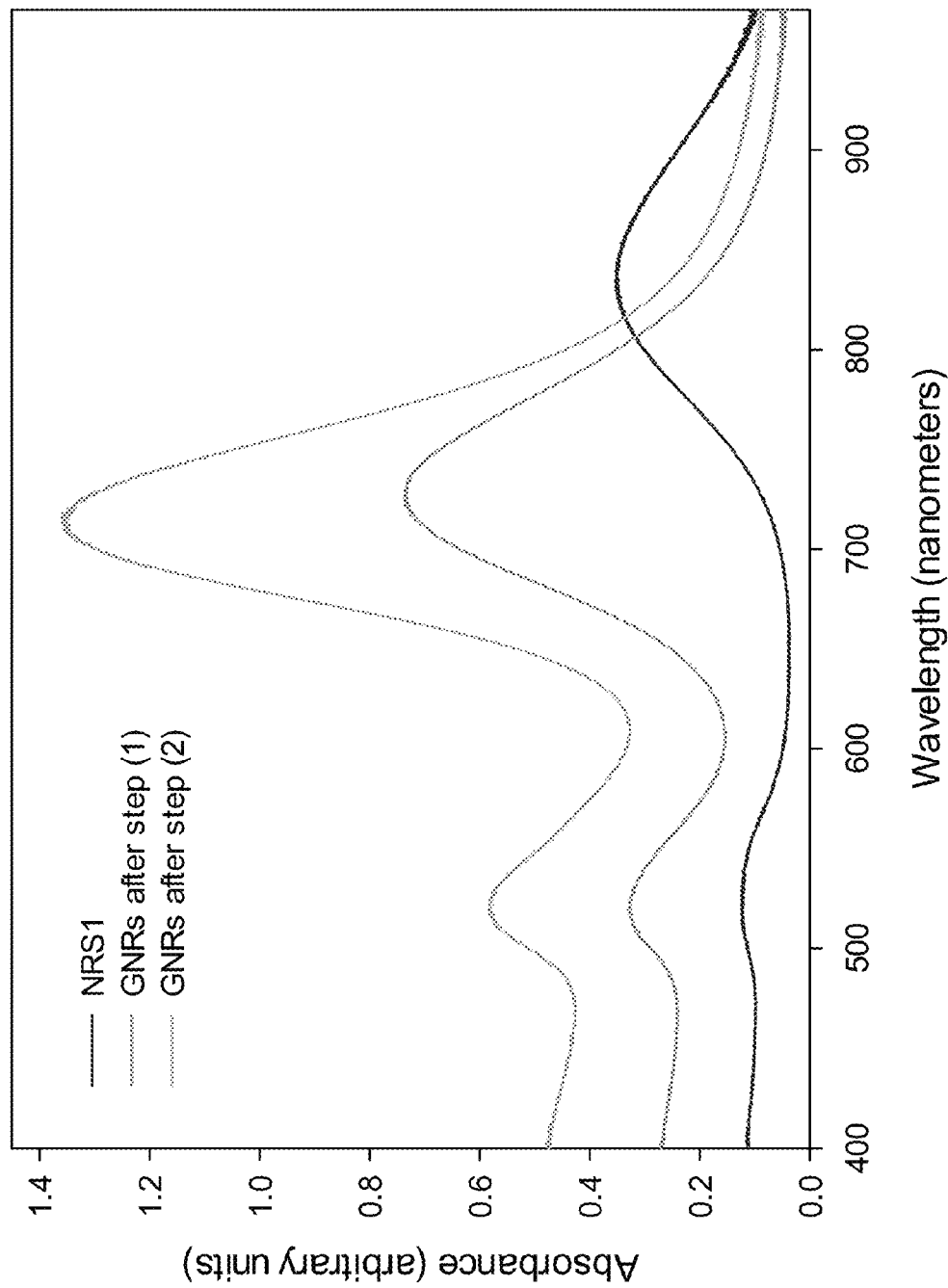
FIG. 18 illustrates experimental results according to one or more experiments disclosed herein.
Figure 36A:
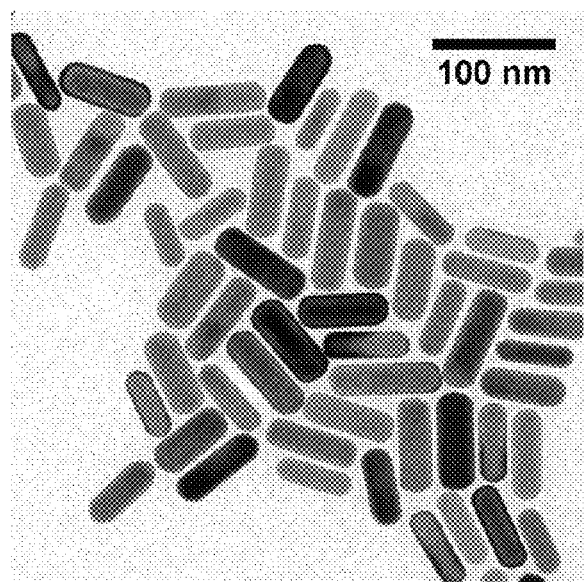
FIGS. 36A, 36B, and 36C illustrate TEM images according to one or more experiments disclosed herein.
Figure 36B:
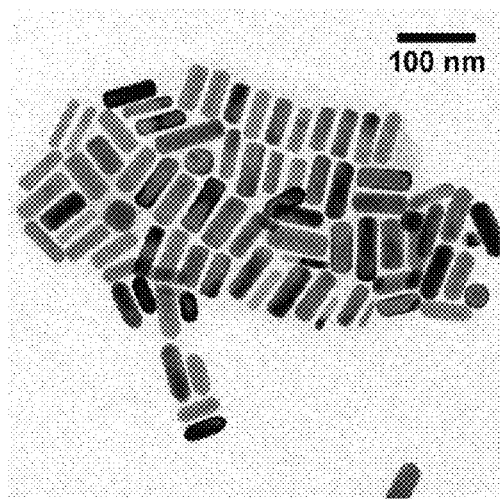
Figure 36C:
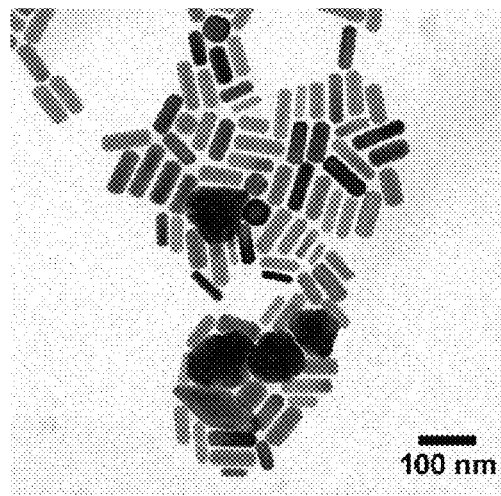

In one or more experiments, it was demonstrated that addition of both additional Au, such as dissolved $HAuCl_4$, and AA in parallel to NPS1 allowed even greater growth of GNRs. In this manner, the about 80% excess Au left in NPS1 is reduced and additional Au is added, which allows for additional growth of the GNRs. This growth was accomplished in a two-step growth procedure: (1) Au (50% extra proportional to Au present in GS1) was added in parallel with 0.1×AA at 10×IN, where the total mass and volume of solution of AA added was 150% of the previously described 0.1×AA and 10×IN solution, and (2) a mass and volume of AA was added at the 0.1×AA at 10×IN rate. This growth is shown in FIG. 18. TEM images are provided as FIGS. 35A, 35B, and 35C for GNRs after step (1) and FIGS. 36A, 36B, and 36C for GNRs after step (2).

Steps (1) and (2) could be repeated several times, at the same rate or different rates, to continue sculpting the GNRs into the desired size and shape. Additionally, this could be coupled with BDAC and/or CTAC growth after a certain point to elongate the GNR in the opposite direction, into the NIR.

Figure 19:
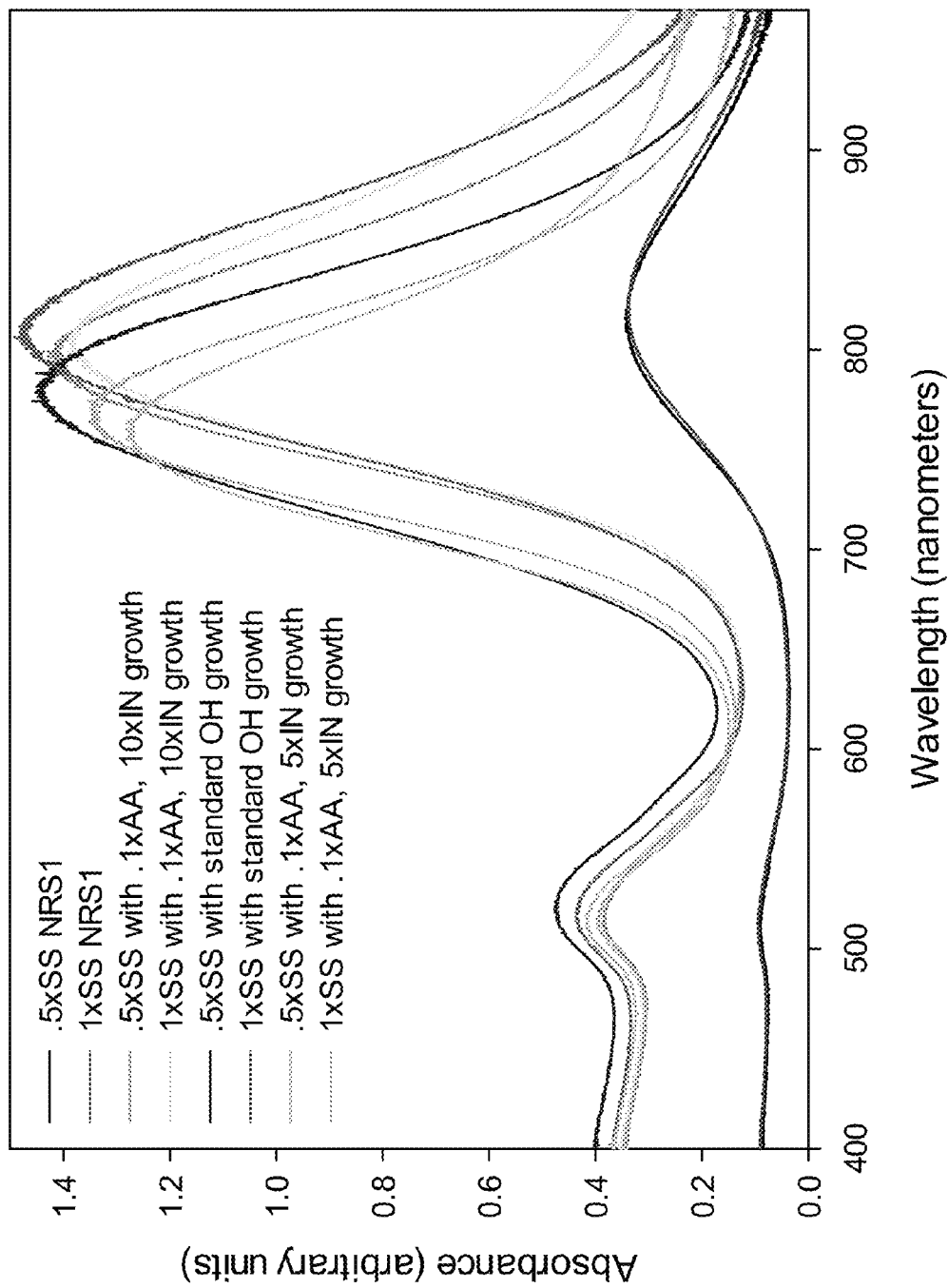
FIG. 19 illustrates experimental results according to one or more experiments disclosed herein.
Figure 20:
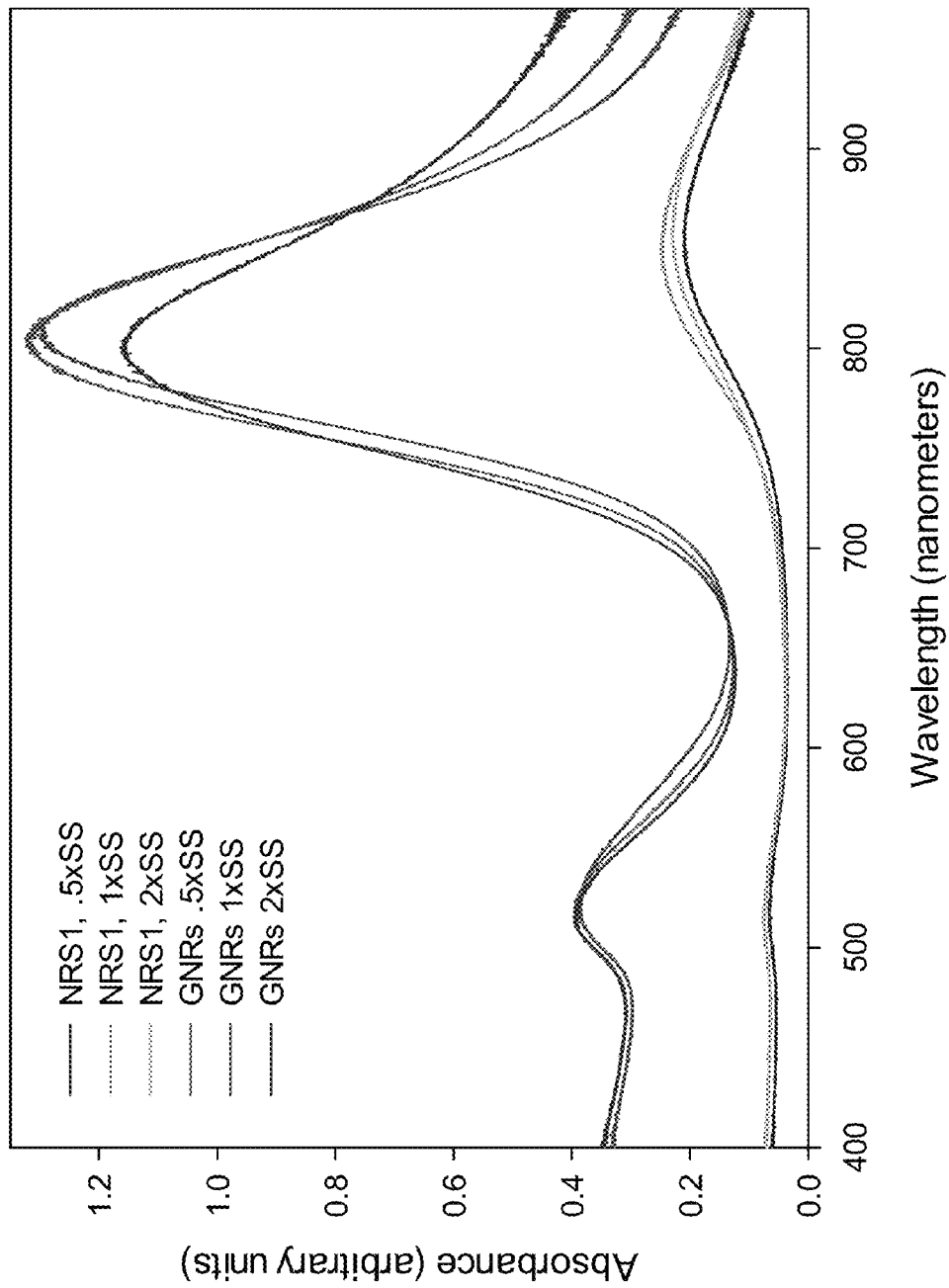
FIG. 20 illustrates experimental results according to one or more experiments disclosed herein.

In one or more experiments, it has been discovered that by varying the seed concentration, the unintended shapes may be removed and, furthermore, growth of NPs with these unintended shapes during GP2 may be prevented. The standardization for this parameter will be with regard to the amount of SS added according to the one or more experiments, which is termed 1×SS herein. In one or more experiments, use of 2×SS, 1×SS, 0.5×SS, and 0.25×SS, demonstrated the effect that varying the amount of SS added to GS1 can have on the optical properties, as illustrated in FIGS. 19, 20, and 13. Changing the SS concentration in GS1 changes the amount of GNRs that grow during GP1, and the more particles that grow, the smaller the GNRs end up, even though the peak location is the same. This may be used to further vary the shape and size of the GNRs.

Figure 21:
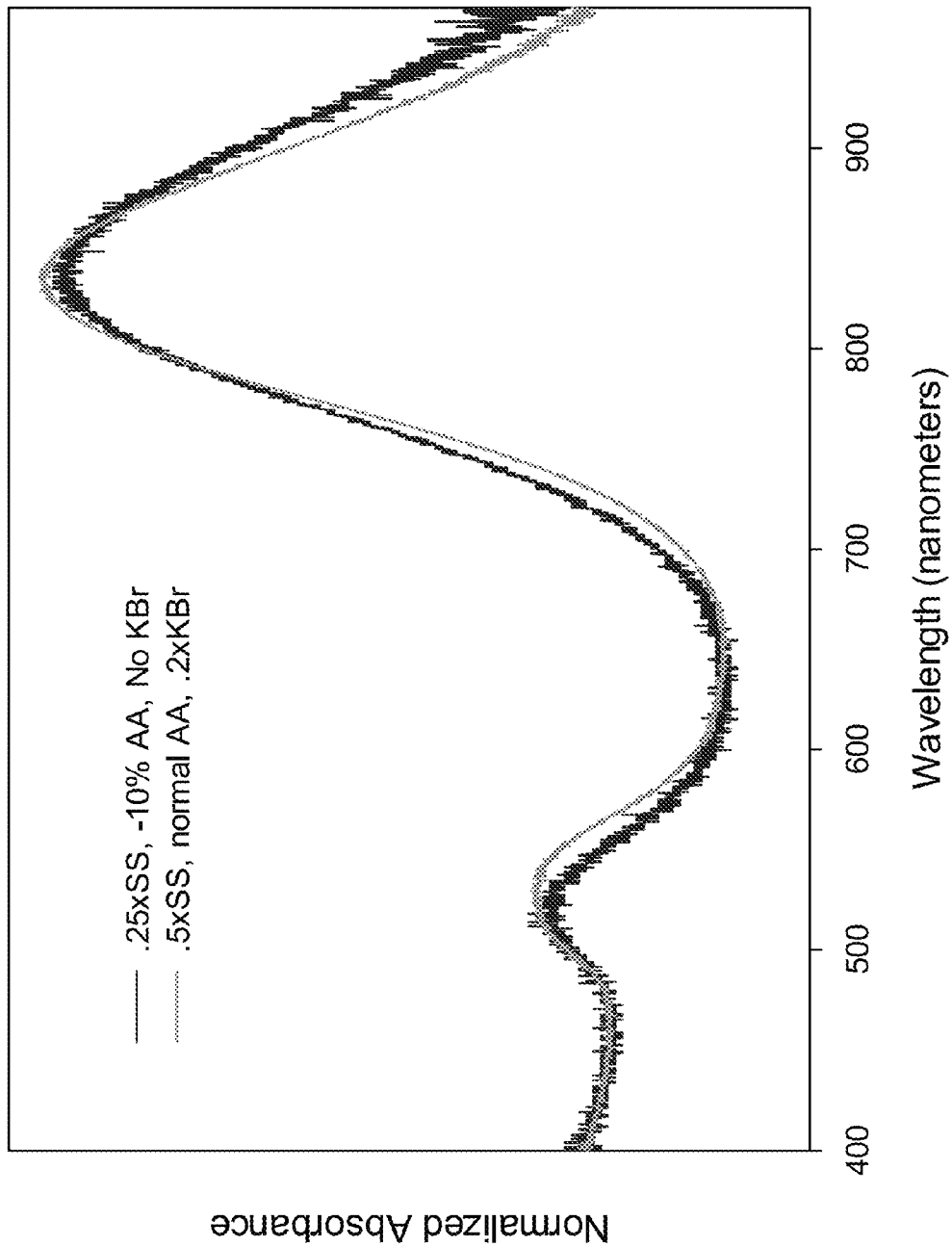
FIG. 21 illustrates experimental results according to one or more experiments disclosed herein.
Figure 22:
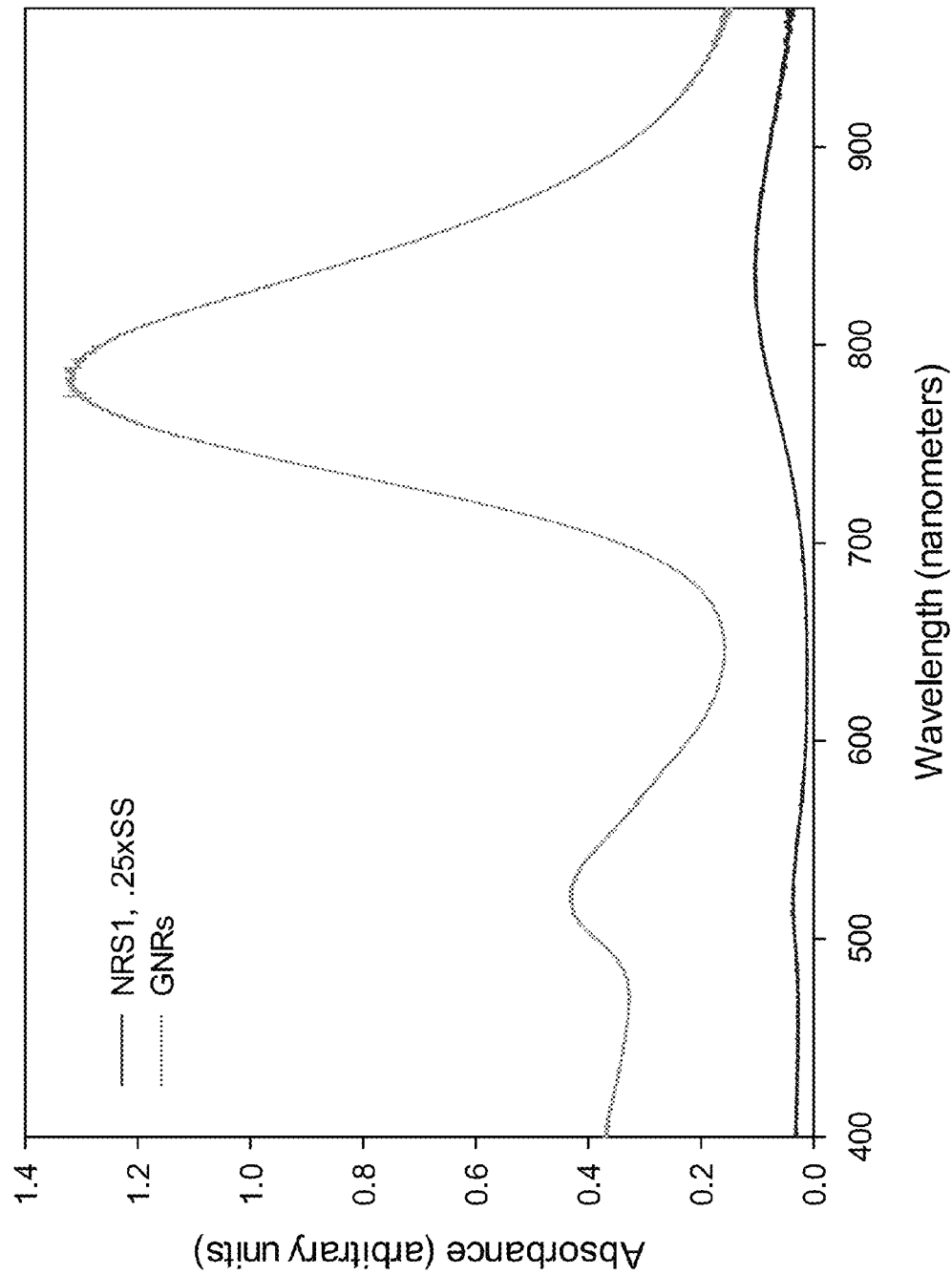
FIG. 22 illustrates experimental results according to one or more experiments disclosed herein.
Figure 37A:
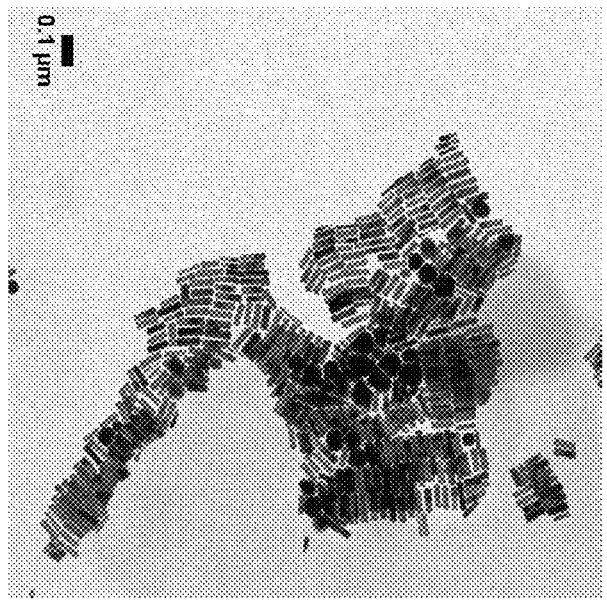
FIGS. 37A, 37B, and 37C illustrate TEM images according to one or more experiments disclosed herein.
Figure 37B:
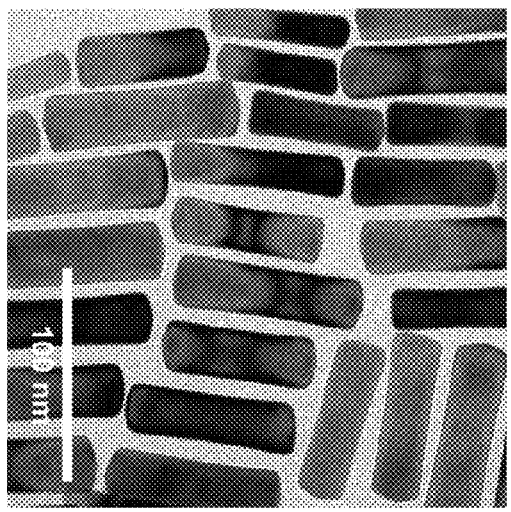
Figure 37C:
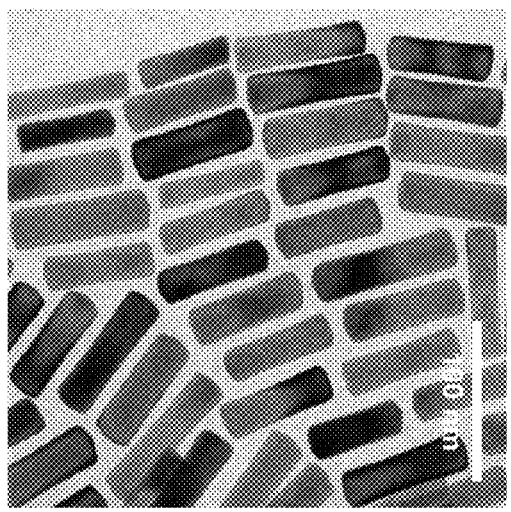

In one or more experiments, it was determined that adding 0.25×SS and about 10% less AA to GS1 gives NPS1 the same optical properties as a 0.5×SS seeded solution using an AA mass as described in the initial synthesis, which is shown in FIG. 21. Subsequent addition of 0.1×AA at 10×IN completed growth of the GNRs, shown in FIG. 22. TEM images of these GNRs are presented in FIGS. 37A, 37B, and 37C.

In one or more experiments, it was determined that for creating 800 nm GNRs, the quality of the SS has an impact, particularly when KBr is added. In one or more experiments, it was determined that preferred results may occur when the SS is synthesized at a constant 30° C., as even slight variations from this temperature will cause variations in NPS1 and ultimately variation in the final GNRs. In one or more experiments, the GP1 and GP2 were standardized to occur at a constant 30° C.

Figure 23:
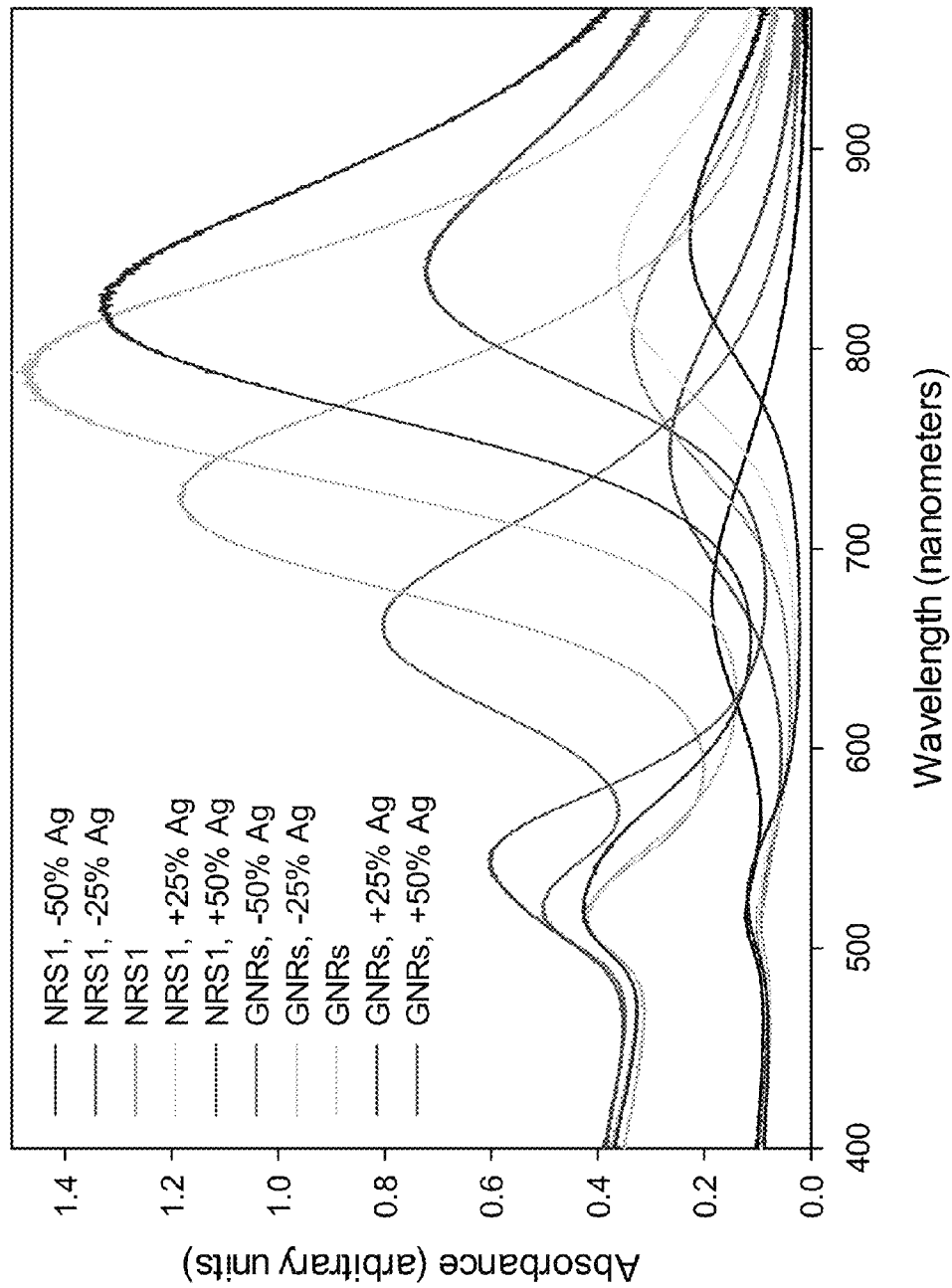
FIG. 23 illustrates experimental results according to one or more experiments disclosed herein.
Figure 24:
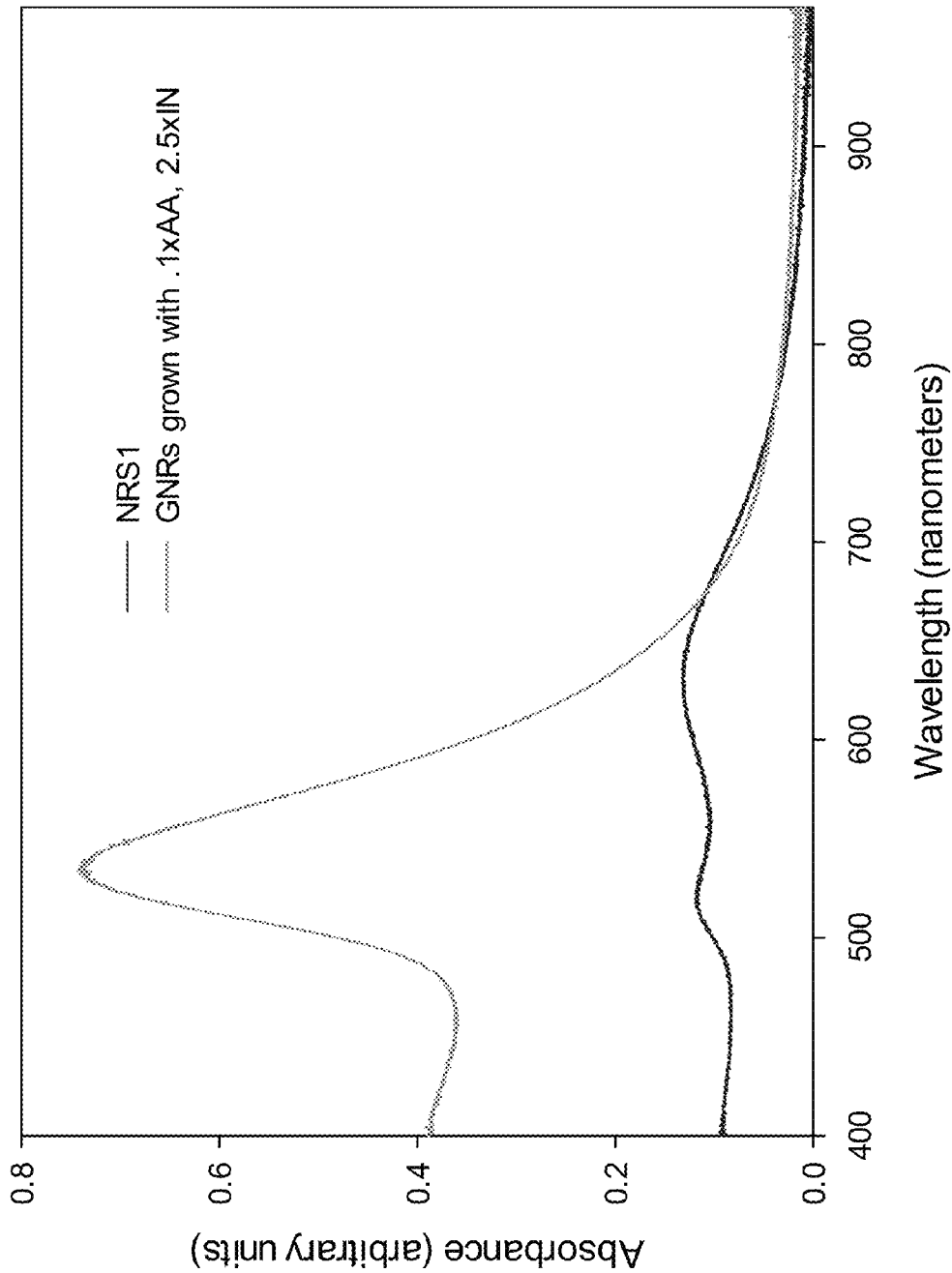
FIG. 24 illustrates experimental results according to one or more experiments disclosed herein.
Figures 25A, 25B:
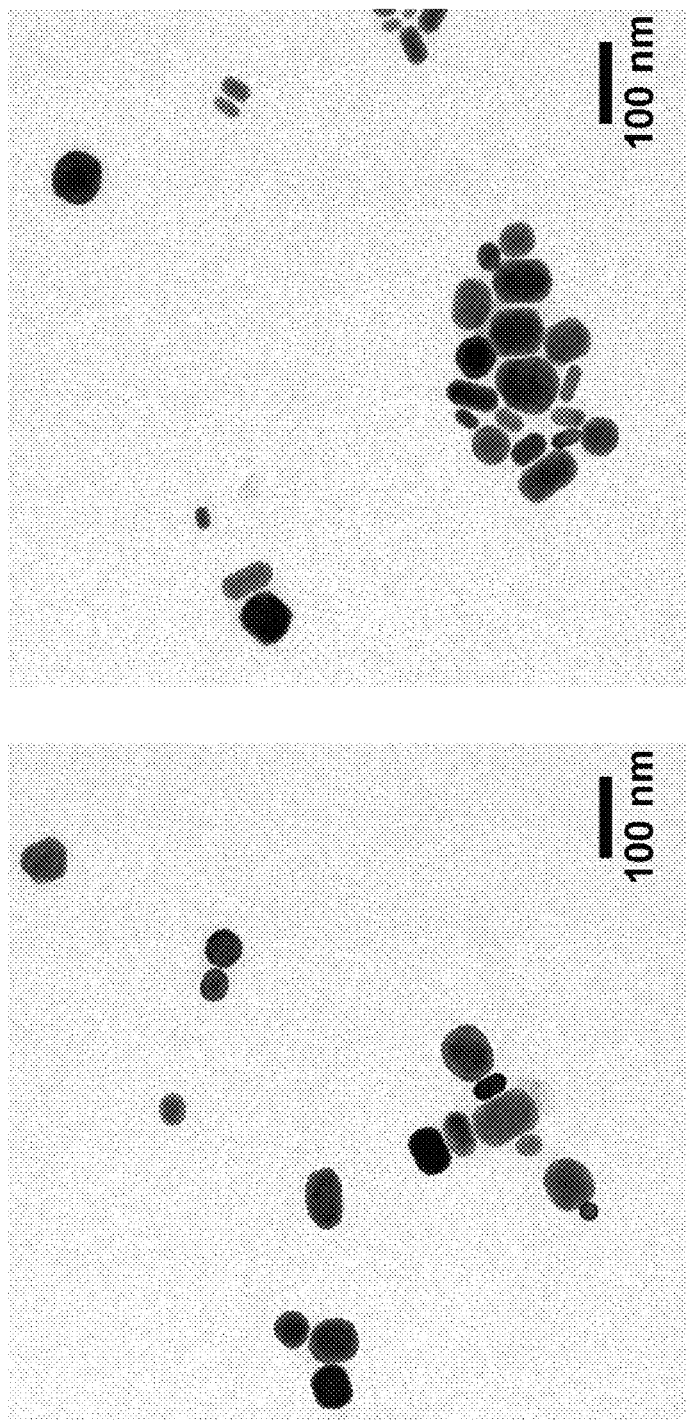
FIGS. 25A and 25B illustrate TEM images according to one or more experiments disclosed herein.
Figure 26A:
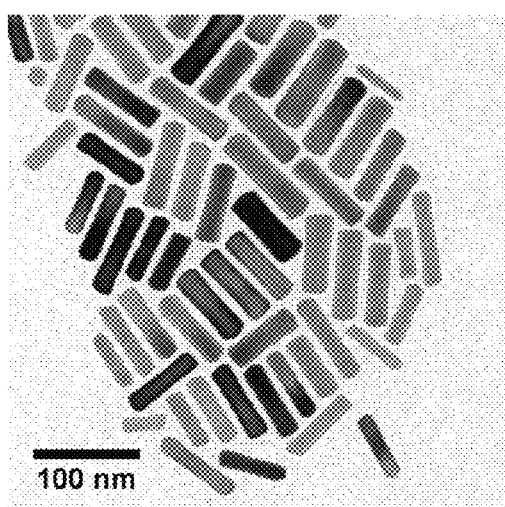
FIGS. 26A, 26B, 26C, and 26D illustrate TEM images according to one or more experiments disclosed herein.
Figure 26B:
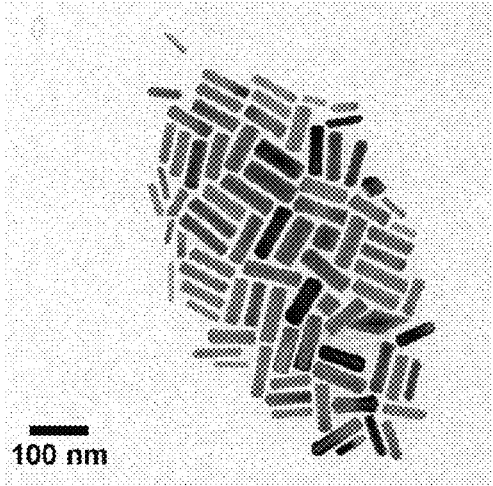
Figure 26C:
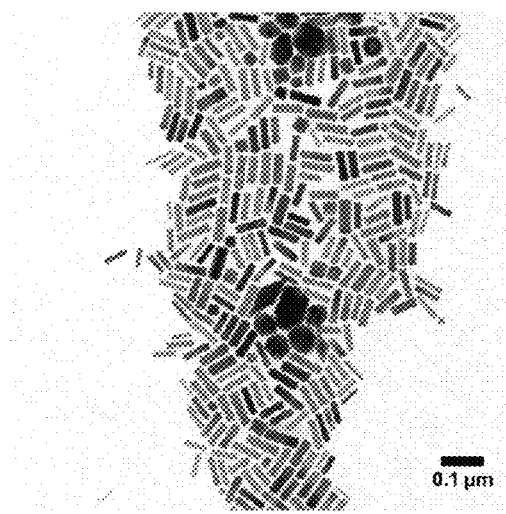
Figure 26D:
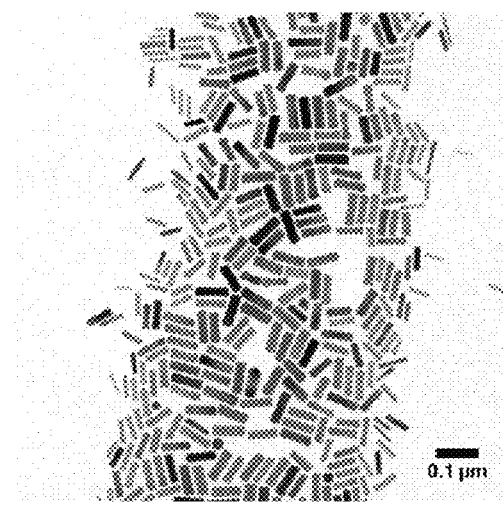
Figure 28B:
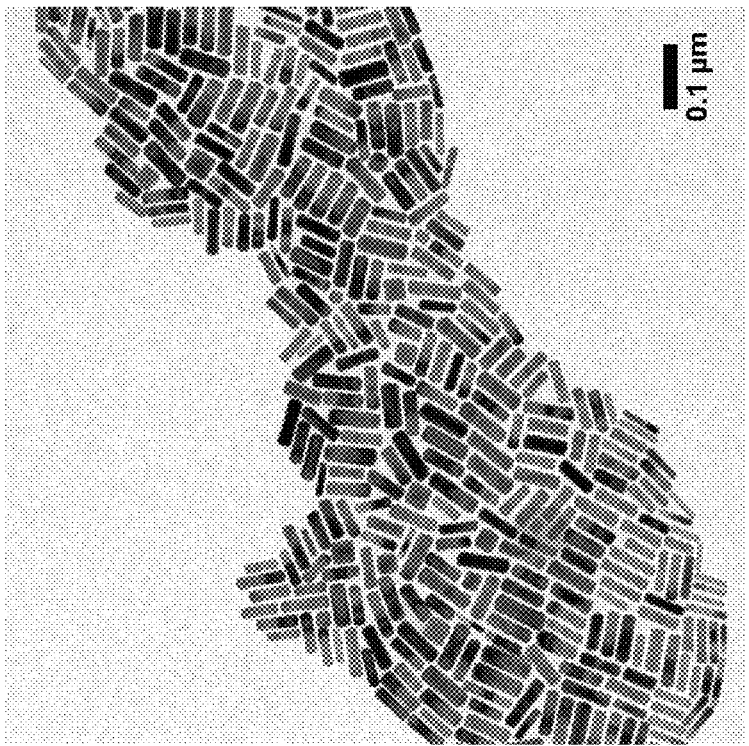
FIGS. 28A and 28B illustrate TEM images according to one or more experiments disclosed herein.
Figure 28A:
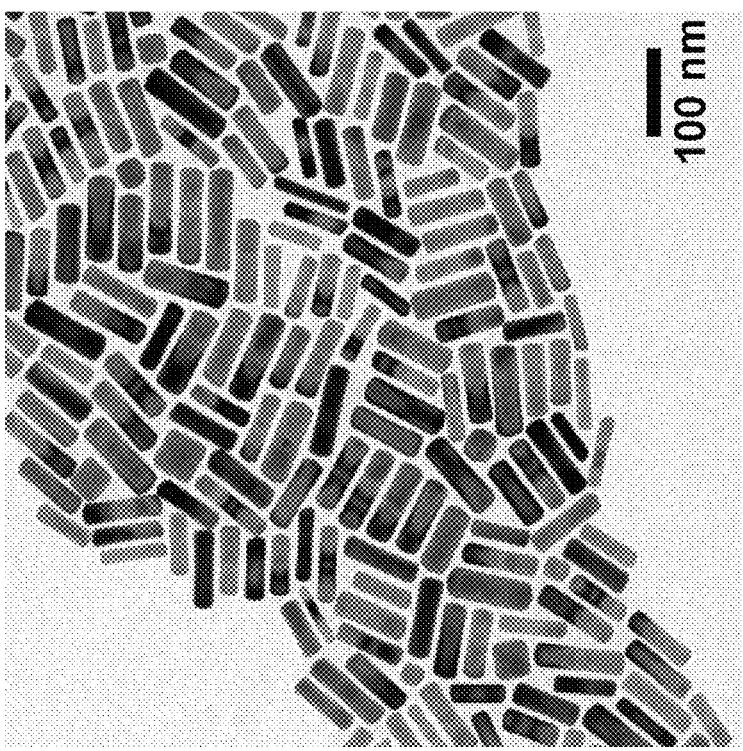
Figure 29B:
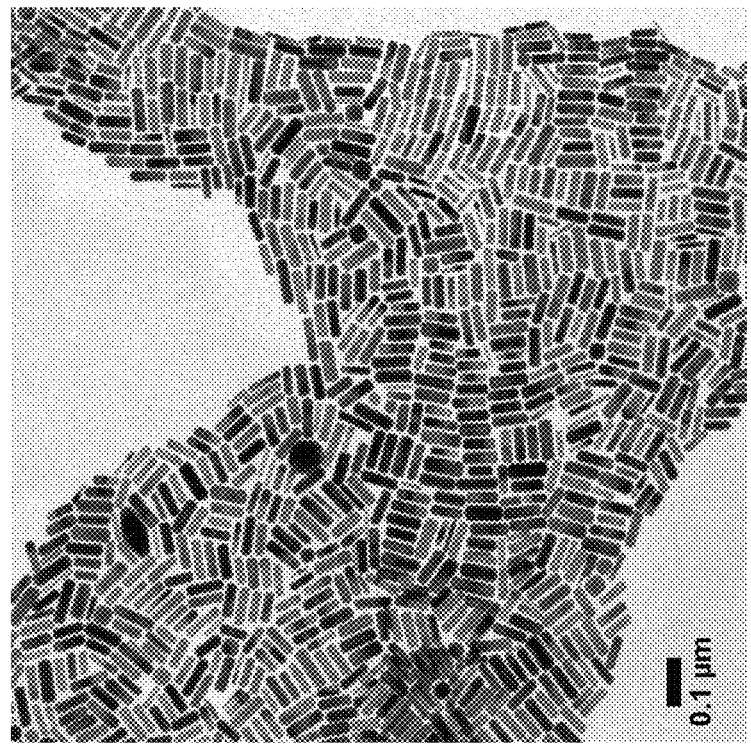
FIGS. 29A and 29B illustrate TEM images according to one or more experiments disclosed herein.
Figure 29A:
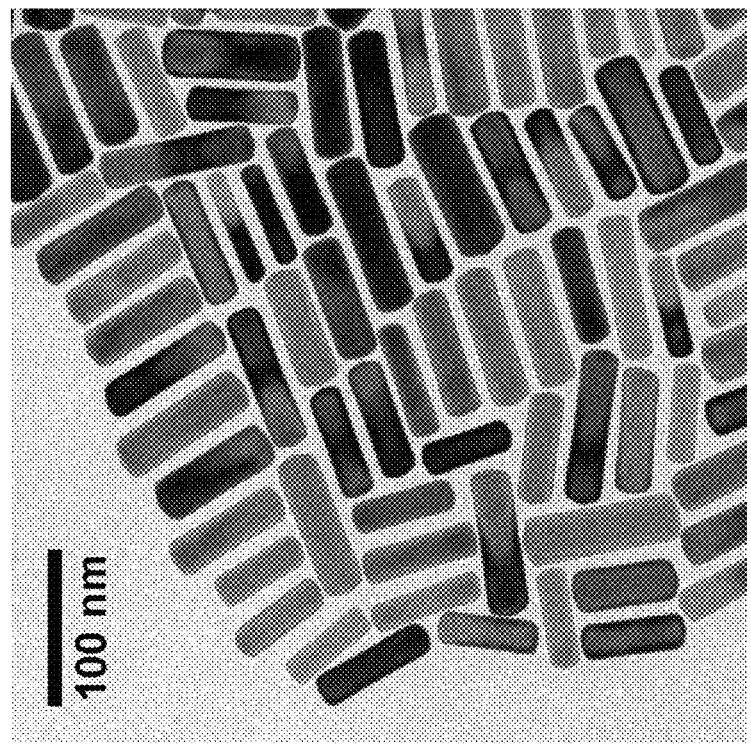

In one or more experiments, it was determined that varying the concentration of Ag in GS1 can move the absorbance peak both significantly toward the blue or a little further to the red (about 850 nm), by adding less or more $AgNO_3$, respectively. In one or more experiments, it was determined that use of less than 50% of the mass of Ag as described in the original synthesis in GS1, at 0.1×AA and 5×IN growth conditions, resulted in GNRs of a lower aspect ratio. In one or more embodiments, if the silver concentration was further modified and the growth method was varied between fast and slow AA additions, or even NaOH additions, cubes, cuboidal shapes, spheres, triangles, prisms, octahedra, and a variety of other shapes may be formed. Variations in Ag concentration and changes in the optical absorbance spectra are shown in FIG. 23. A grown solution with a small initial amount of Ag is shown in FIG. 24, for which TEM is illustrated in FIGS. 25A and 25B.

In one or more experiments, it was determined that preferred conditions for synthesizing highly monodisperse GNRs that absorb at 800 nm may include 1) 0.5×SS with 0.1×KBr in the SS, 2) 0.2×KBr in GS1, and 3) 0.1×AA at 10×IN during GP2. Spectra for solutions synthesized using these and similar parameters on the 200-mL scale are shown in FIG. 10.

Neither GP1 nor GP2, in any specification, needs to run to completion for the one or more methods disclosed herein. If NPs of the desired dimensions and properties can be found during any stage of any growth phase, the process at that moment can be interrupted, the solution can be purified. Centrifugation is commonly performed to remove the excess ionic Au species, which could otherwise continue growth of the NPs, and the final product can be stabilized and stored in an aqueous CTAB solution.

In one or more embodiments, to the solutions may include bromide ions from various chemical sources.

In one or more embodiments, gold and silver ions have been shown to deposit onto gold NPs such as GNRs, yet addition of an iron salt such as $FeCl_3$ provides iron ions in solution that are known to etch gold NPs. Therefore, addition of $FeCl_3$ may further alter the GNR size. The rate and extent of etching, which may be considered as reversing the growth process, may be controlled by adjusting the parameters of the automated injection of the metal salt GS2 into a stirring NRS1 solution. Therefore, GP2 may include adding a solution solely of an iron salt, or it may include addition of an iron salt solution in parallel with any or all of, but not limited to, the following solutions: a metal salt solution (gold, silver, etc.), a reducing agent (ascorbic acid, etc.) solution, and a base (sodium hydroxide, potassium hydroxide, ammonia, etc.). Combining several solutions may further alter the etching or growth. For example, the mixture of reagents might impose a slow growth rate, or it may introduce growth on a specific crystal plane while etching another. Such selective control of the growth process may allow the predominant NP shape present to be different from the initial shape in NRS1.

In one or more embodiments, the method described in the preceding paragraph may also be used to manipulate the distribution of shapes within a NP solution through selective etching of particular crystal faces, while not affecting others. Selective etching may enable sample purification by removing NPs with undesired shapes, such as spheres, from solution, while minimally altering the shape and size of the desired NPs. Manipulation of the rate of addition and concentration of an iron salt solution added during GP2 may enable fine control over the etching process. Addition of other solutions in parallel as mentioned above may allow for further refinement of this step.

In one or more embodiments, the presence of metal ions, such as iron, in GS1 may affect the reaction kinetics of GP1, thereby enabling kinetic control. Such kinetic control may involve slowing the growth of gold NPs, such as GNRs, on certain planes or slowing the growth of the entire NP during GP1. This procedure may be used to limit the growth of undesired shapes or sizes of NPs during GP1, thereby improving the shape and size monodispersity.

In one or more embodiments, addition of an iron salt solution briefly after the beginning of GP1 may also enable further control over the growth of NPs from the SS into NRS1, which could include a combination of any or all of, but not limited to, the effects described in the preceding two paragraphs. In one or more embodiments, addition of an iron salt solution at or after the start of GP1 may allow for the preferential formation of GNRs by favoring the production of GNRs instead of spherical gold NPs. If added shortly after the beginning of GP1, the iron ions may be able to completely etch away small gold NPs that would produce undesired shapes in NRS1 but may not etch GNRs if the nanorods shape of the GNRs imparts resistance towards etching. The size and aspect ratio of the GNRs produced in this manner may also differ from GNRs that might be obtained if iron ions are added during GP2, since addition of the iron salt may have different effects during GP1 and GP2. Addition of the iron salt solution includes an intermediate growth solution that is independent of the preparation of GS1 and GS2.

In one or more embodiments, the presence of iron ions may serve to counteract the reduction of gold by ascorbic acid and/or sodium hydroxide, as iron ions may prevent NP growth, while AA and NaOH may promote it. In one or more embodiments, the effects listed for the element of iron may be extended to other elements, such as copper, magnesium, etc.

The one or more experiments disclosed herein may be scaled-up from 200 mL to 1 L, and may also be scalable to 10 L, 100 L, and even over 1,000 L. At such scales, injection methods utilizing simultaneous multiple injections at different locations within the reaction vessel may be required in order to increase the speed with which solutions at large scales homogenize, thereby minimizing the likelihood of additional homogeneous nucleation events. The secondary growth phase that has been introduced has many possible uses. The GNRs produced according to the one or more methods disclosed herein that absorb at 800 nm may be of significant interest for biomedical applications. This method has potential to quickly produce large quantities of GNRs and other shapes that absorb between 530 nm into the NIR past 1000 nm with minimal effort.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for making a nanostructure, the method comprising:
   adding a seed solution to a first aqueous growth solution comprising ascorbic acid to produce a nanoparticle solution in a first growth phase; and subsequent to the first growth phase
   continuously adding, with constant agitation, a second growth solution comprising ascorbic acid to the nanoparticle solution to further produce a gold nanostructure in a second growth phase.

2. The method of claim 1, wherein at least one of the seed solution and the first growth solution comprises surfactant, further wherein the surfactant is selected from the group consisting of cetyltrimethylammonium bromide (CTAB), cetyltrimethylammonium chloride (CTAC), benzyldimethylhexadecylammonium chloride (BDAC), benzyldimethylhexadecylammonium bromide (BDAB), and combinations thereof.

3. The method of claim 1, further comprising adding metal ions and nanostructures to the seed solution, and further wherein the metal ions and nanostructures are selected from the group consisting of gold ions, nanostructures, and combinations thereof.

4. The method of claim 1, further comprising adding a borohydride to the seed solution, and further wherein the borohydride is sodium borohydride.

5. The method of claim 1, further comprising adding a bromide salt to the seed solution, further wherein the bromide salt is potassium bromide.

6. The method of claim 1, wherein the seed solution is composed of a hydroxide, and further wherein the hydroxide is either sodium hydroxide or potassium hydroxide.

7. The method of claim 1, further comprising adding a bromide salt to the first growth solution, further wherein the bromide salt is potassium bromide.

8. The method of claim 1, further comprising adding a base into the first growth solution, further wherein the base is either sodium hydroxide or potassium hydroxide.

9. The method of claim 1, wherein the second growth solution comprises a metal hydroxide, and, further wherein the metal hydroxide comprises sodium hydroxide.

10. The method of claim 1, comprising adding additional surfactant to the growth solution after initiation of the first growth phase, and further wherein the surfactant is selected from the group consisting of cetyltrimethylammonium bromide (CTAB), cetyltrimethylammonium chloride (CTAC), benzyldimethylhexadecylammonium chloride (BDAC), benzyldimethylhexadecylammonium bromide (BDAB), and combinations thereof.

11. The method of claim 1, comprising adding a bromide salt to the growth solution after initiation of the first growth phase, and further wherein the bromide salt is potassium bromide.

12. The method of claim 1, wherein continuously adding a second growth solution comprises injecting the second growth solution, and wherein the injection occurs at a constant or varied rate.

13. The method of claim 1, wherein the constant agitation is one of stirring, sonication, vibration, shaking, and combinations thereof.

14. The method of claim 1, wherein two or more solutions are injected into the second growth solution, and further wherein the solutions are injected in parallel or staggered, and combinations thereof.

15. The method of claim 1, comprising, during the progression of addition of the second growth solution during the second growth phase, completing an injection of the second growth solution instantaneously, and further wherein reducing remaining metal ions in the solution.

16. The method of claim 1, wherein, anytime during the first growth phase or the second growth phase, synthesis of the nanostructure is interrupted, followed by the removal of any reactive agents and the collection of nanoparticles or nanostructures in their current state.

17. The method of claim 1, further comprising providing heat to all solutions, further wherein the solutions are heated to between about 20 degrees Celsius and about 150 degrees Celsius.

18. The method of claim 1, wherein the gold nanostructure has a longitudinal surface plasmon resonance wavelength within a range of 530 nm to 1000 nm.

19. The method of claim 1, wherein the gold nanostructure has a longitudinal surface plasmon resonance wavelength above 1000 nm.

* * * * *